(12) United States Patent
Yukawa et al.

(10) Patent No.: US 7,784,952 B2
(45) Date of Patent: Aug. 31, 2010

(54) ENCLOSED LENS TYPE RETROREFLECTIVE SHEET WITH WIDE-ANGLE REFLECTIVE PERFORMANCE AND EXTERNAL ILLUMINATION SYSTEM

(75) Inventors: Shigeo Yukawa, Wakayama (JP); Hideyuki Oki, Kainan (JP); Yoshitaka Ura, Wakayama (JP)

(73) Assignee: Kiwa Chemical Industry Co., Ltd., Wakayama (JP)

( * ) Notice: Subject to any disclaimer, the term of this patent is extended or adjusted under 35 U.S.C. 154(b) by 0 days.

(21) Appl. No.: 10/567,259

(22) PCT Filed: Mar. 2, 2005

(86) PCT No.: PCT/JP2005/003481

§ 371 (c)(1),
(2), (4) Date: Feb. 6, 2006

(87) PCT Pub. No.: WO2005/088359

PCT Pub. Date: Sep. 22, 2005

(65) Prior Publication Data

US 2006/0256439 A1  Nov. 16, 2006

(30) Foreign Application Priority Data

Mar. 10, 2004 (JP) ............................. 2004-068130

(51) Int. Cl.
*G02B 5/128* (2006.01)
(52) U.S. Cl. ................................... 359/536
(58) Field of Classification Search ................. 359/536, 359/538–540, 529; 40/612
See application file for complete search history.

(56) References Cited

U.S. PATENT DOCUMENTS

| 3,014,409 A * | 12/1961 | Palmquist .................. 359/538 |
|---|---|---|
| 3,204,537 A * | 9/1965 | Searight ..................... 359/540 |
| 3,493,286 A | 2/1970 | Bacon, Jr. |
| 3,795,435 A | 3/1974 | Schwab |
| 4,505,967 A | 3/1985 | Bailey |
| 4,664,966 A | 5/1987 | Bailey et al. |
| 4,808,471 A | 2/1989 | Grunzinger |
| 5,818,640 A | 10/1998 | Watanabe et al. |
| 5,847,795 A | 12/1998 | Satoh et al. |
| 6,333,817 B1 * | 12/2001 | Kashima et al. ............. 359/599 |
| 6,365,262 B1 * | 4/2002 | Hedblom et al. ............ 428/143 |
| 6,479,132 B2 * | 11/2002 | Hedblom et al. ............ 428/143 |

FOREIGN PATENT DOCUMENTS

| CN | 1238044 A | 12/1999 |
|---|---|---|
| JP | 51-128293 | 11/1976 |
| JP | 58-88202 | 6/1983 |
| JP | 4-86701 | 3/1992 |
| JP | 6-289207 | 10/1994 |

(Continued)

*Primary Examiner*—Stephone B Allen
*Assistant Examiner*—Jennifer L. Doak

(57) ABSTRACT

The retroreflective sheet of the present invention comprises a surface layer (1) including at least one layer, a focusing layer (2) containing glass spheres (3), and a metal reflective layer (4) on the back side of the focusing layer (2), wherein the glass spheres (3) are disposed at random locations in the thickness direction of the focusing layer (2). The external illumination system of the present invention comprises a sign having a sign face including the above-mentioned retroreflective sheet, and an external illumination source, and the distance from the illumination source to the sign face is within a range of at least 1 m and no more than 100 m. The present invention thereby provides a retroreflective sheet and an external illumination system with which wide-angle reflective performance with a wider incidence angle and observation angle can be ensured.

21 Claims, 14 Drawing Sheets

FOREIGN PATENT DOCUMENTS

| | | |
|---|---|---|
| JP | 8-27402 | 3/1996 |
| JP | 8-101304 | 4/1996 |
| JP | 2910868 | 4/1999 |
| JP | 2002-40210 | 2/2002 |
| KR | 74836 | 2/1994 |
| WO | 98/222837 | 5/1998 |
| WO | 98/26313 | 6/1998 |
| WO | 01/29587 | 4/2001 |

\* cited by examiner

ENCLOSED LENS TYPE RETROREFLECTIVE SHEET WITH WIDE-ANGLE REFLECTIVE PERFORMANCE AND EXTERNAL ILLUMINATION SYSTEM

TECHNICAL FIELD

The present invention relates to a retroreflective sheet and an external illumination system, which can be used for road signs, guide signs, signboards for safety guidance, safety signs, advertising signs, and so forth.

BACKGROUND ART

Retroreflective sheets have found use in a wide range of applications, such as traffic signs, guide signs, warning signs, restriction signs, vehicle license plates, advertising signs, and so forth. An example of these retroreflective sheets something is called an enclosed lens type, which comprises at least one surface layer, glass beads with a high refractive index, a focusing layer (also called a focusing resin layer), and a metal reflective layer, which are layered in that order. Another configuration is what is called an encapsulated lens type, which comprises a plurality of transparent spheres provided with a reflective mirror on the lower hemisphere, a support resin sheet for supporting the plurality of transparent spheres, and a transparent cover film that covers the plurality of transparent spheres by being disposed on the surface of the support resin sheet. A joining component that supports the cover film is formed on the support resin sheet. With an encapsulated lens type, because the reflective mirror is formed directly on the surface of the transparent spheres, the reflective brightness at a small observation angle and up to a large incidence angle is markedly superior to that of an enclosed lens type, so this type also is called a high-intensity retroreflective sheet. In the above-mentioned retroreflective sheets, a pressure-sensitive adhesive and a release paper or film further are laminated. Such retroreflective sheets are applied to a substrate, such as an aluminum plate, steel plate, painted steel plate, stainless steel plate, or other such metal substrate, or a plate of fiber reinforced plastic (FRP), hard vinyl chloride, or other such plastic plate, and used as a sign, advertisement board or the like. In the daylight these retroreflective sheets look the same as ordinary signs or a signboard, but at night they accurately retroreflect projected light in the direction of the light source, so they have been useful in greatly enhancing the visibility of the above-mentioned signs, license plates, signboards, and so on.

The retroreflective performance of these retroreflective sheets has been specified by standards in various countries around the world by means of the angle formed by the irradiation axis of projected light and the face center normal line of the retroreflective sheet (the incidence angle) and the angle formed by the irradiation axis of projected light and the observation axis (the observation angle).

However, Japanese Industrial Standard JIS Z 9117 and various standards from around the world only require a maximum of 2° for the observation angle, and a maximum of 50° for the incidence angle.

Therefore, the retroreflective sheets that are currently available on the market are manufactured so as to meet these standards. The minimum requirement for the above signs, license plates, and so forth is to satisfy the reflective performance standards for each country Still, even if these standards are met, there have been problems with commercial products in that with a road sign installed at a right angle to the road, for example, even though the sign may be effective on a straight road, if the incidence angle exceeds 50° at a place where the road bends, there is a pronounced decrease in reflective performance, and the visibility of the sign is drastically reduced. When the application is a vehicle license plate, the observation angle will be large if the driver's seat of a following vehicle is located up high (such as with a truck) and the vehicle in front has a license plate that is located down low, and the incidence angle will be large if the vehicle in front turns to the right or left; in either case this makes it difficult for the license plate of the vehicle in front to be seen from the following vehicle.

Furthermore, it is said that a vehicle traveling at 40 km/h takes from 18 to 22 meters to come to a stop once a hazard is recognized, but when a location 3 meters off the side of the road is passed at 40 km/h, it is said that an incidence angle of approximately 82° is required to confirm the safety of the road side 22 meters ahead by utilizing a retroreflective sheet. In addition, with a conventional retroreflective sheet installed approximately parallel to the road, because of the extremely wide viewing angle, information cannot be conveyed accurately. Consequently, there is a strong market demand for the development of a retroreflective sheet with superior wide angle characteristics.

As a way of dealing with the above, Patent Document 1 below proposes that with the above-mentioned enclosed lens type retroreflective sheet, for example, a focusing resin layer of uniform thickness be formed by using a resin paint to powder coat the upper hemispherical surface of glass microspheres whose lower hemisphere is embedded in a surface resin layer. Patent Document 2 below proposes that a transparent resin film formed ahead of time in a uniform thickness be superposed over the exposed surface of transparent microspheres that have been half-buried in a layer such as a surface resin layer, and this transparent resin film be heated and softened to embed the transparent microspheres securely and form a transparent resin focusing layer. Patent Document 3 below proposes that a retroreflective sheet having less angle dependence and excellent retroreflective performance can be obtained, by embedding in a surface layer a multilayer microsphere structure composed of a transparent focusing layer formed so as to cover the above-mentioned transparent microspheres substantially concentrically in a substantially constant thickness on the surface of the transparent microspheres, and then forming a reflective layer. Patent Document 4 below proposes a retroreflective sheet comprising numerous transparent microspheres embedded in a transparent resin, a focusing resin layer, and a light reflecting layer, in which the light reflecting layer on the top of the back side of the transparent microspheres is located in closer contact to the transparent microspheres than is the focal position of the transparent microspheres, and the light reflecting layer on the lateral back side of the transparent microspheres is at the focal position. Patent Document 5 below discloses an external distant illumination system and method, which in recent years has been gaining popularity in road signs. Furthermore, retroreflective sheets that are already on the market and provide wide-angle visibility include a wave reflector (made by NTW), which is a super-wide angle visual guidance material in which a microprismatic retroreflective sheet is used for the reflection face and the material is formed in a wavy shape, a wide-angle prismatic retroreflective sheet (VIP Grade, made by 3M), and a wide-angle prismatic retroreflective sheet used for side markings (EV-9010, made by 3M).

Patent Document 1: JP S51-128293A
Patent Document 2: JP H8-27402B ((JP S59-198402A)
Patent Document 3: JP H8-101304A
Patent Document 4: JP S58-88202U
Patent Document 5: Japanese Patent No. 2,910,868 (JP H10-506721A (Tokuhyo))

However, the difficulty with the reflective sheet proposed in Patent Document 1 above was how to form the powder of the focusing resin layer in a uniform thickness on the surface of the microspheres. The difficulty with the reflective sheet proposed in Patent Document 2 above was how to bring the film into close contact with the microsphere surface or the surface resin layer in which the microspheres were embedded. With the reflective sheet proposed in Patent Document 3 above, it was extremely difficult to form the required focusing layer film thickness accurately on the surface of the microspheres. There is a certain amount of distribution to the diameter of the microspheres, and the optimal film thickness cannot be obtained for all of the microspheres even if the focusing layer film is formed in a thickness suited to the median diameter. Therefore, this product is far from matching the reflective performance of encapsulated lens type retroreflective sheets in which optimal reflective performance is obtained with all of the microspheres by providing the reflecting layer directly on the individual microspheres. Also, there is no mention of the means or method for achieving the reflective performance at a large observation angle. Therefore, merely forming the focusing layer in a constant thickness at the focus formation position, as was the case with these proposals, was insufficient to ensure wide-angle reflective performance at a larger observation angle and a large incidence angle. If good reflective performance could be obtained at a small observation angle, the above-mentioned encapsulated lens type retroreflective sheets would be satisfactory. Patent Document 5 discloses a sign illumination system and method in which a sign is illuminated from an illumination source installed on the road shoulder away from the sign, but even conventional encapsulated lens type retroreflective sheets that are said to have a wide observation angle do not exhibit good enough reflective performance for use in this illumination system. For instance, in the case of a multilane road, there is a considerable difference between the brightness at which the sign can be seen from a vehicle traveling in the far left lane, and the brightness at which the sign can be seen from a vehicle traveling in the far right lane. Specifically, light emitted from an external flood light can be seen at a relatively small observation angle from a vehicle traveling in the far left lane, so there is a relatively large amount of light that bounces back from the sign and the sign looks brighter, but the observation angle is much larger for a vehicle traveling in the far right lane, which greatly reduces the amount of light that bounces back from the sign and makes the sign look far darker.

Furthermore, a microprismatic retroreflective sheet tends to lose some of its retroreflective performance when the light hits obliquely or from the side, so the above-mentioned wave reflector is designed such that the above-mentioned microprismatic retroreflective sheet is given a wavy shape, which reduces the incidence angle of light irradiated obliquely or from the side with respect to the retroreflective sheet for the light to enter. This does result in an increase in retroreflective brightness, but the retroreflective sheet itself does not have any inherent wide-angle characteristics. Also, since the sheet is formed in a wavy shape, it is extremely difficult to print on a wave reflector by screen printing or another such method, so there is the drawback that the required information has to be incorporated into the retroreflective sheet prior to the wave molding, and the molding performed only after this, and this drives up the cost. In addition, there are large undulating depressions on the reverse side of the wave reflector, and when it is applied to a side wall of a road, dirt and other such foreign matter accumulates in these depressions, which markedly reduces the attractiveness of the sheet.

Also, the above-mentioned wide-angle prismatic retroreflective sheet (VIP) was not designed so that retroreflective performance could be exhibited at a relatively large observation angle and when the light was incident obliquely or from the side. For example, retroreflective performance could not be maintained at an observation angle of 4° and an incidence angle of 40° or more.

With a wide-angle prismatic retroreflective sheet used for side markings (EV-9010, made by 3M), retroreflective performance can be maintained even at a large observation angle and a large incidence angle when the observation point is located in the lateral direction of the sheet (the marking direction), but there is a drastic decrease in retroreflective performance if the incidence angle is over 60° when the observation point is located in the longitudinal direction of the sheet (the vertical direction). When a person is driving a vehicle, the eyes of the driver (that is, the observation point) are located above the headlights, so the retroreflective effect will not be manifested adequately to the driver of the vehicle if one of these wide-angle prismatic retroreflective sheets used for side markings is employed for visual guidance entailing a large incidence angle.

A conventional enclosed lens type of retroreflective sheet will now be described with reference to FIG. 8A. First, a surface layer 10 is produced on a processing substrate. This surface sayer 10 is then coated with a resin solution that forms a glass sphere fixing layer 11. This coating is then dried to disperse the glass spheres 13 in a still tacky state in the glass sphere fixing layer 11. This or another such method is used to bond the glass spheres to the glass sphere fixing layer 11, after which the fixing layer 11 is heated, which submerges the glass spheres 13 and thermally cures the fixing layer 11, thereby sufficiently fixing the glass spheres 13. In the next step, the surface of the glass spheres 13 is coated with a resin solution that forms a focusing layer 12, and this coating is dried. In this case, the glass sphere fixing layer 11 is adjusted to a thickness that is from 50 to 80% of the diameter of the glass spheres 13 when the glass spheres have been submerged. The glass spheres are fixed in a state of just reaching the surface layer. In the FIGS. 15 is a pressure sensitive adhesive layer and 16 is a released material.

There is also an enclosed lens type of retroreflective sheet in which the surface layer 10 and the glass sphere fixing layer 11 are constituted as the same layer, in which case the glass spheres are held submerged in the above-mentioned same layer to up to about 60% of their diameter, from roughly the center of the glass spheres. Here again, the same method as above is employed, in which a focusing layer resin solution is applied and dried.

The focusing layer 12 is thus formed by applying and drying a focusing layer resin solution, and in this case the focusing layer resin solution uniformly coats the entire surface of the sheet and is then dried, so the focusing layer film thickness cannot be adjusted individually for each glass sphere, and the focusing layer is merely formed in a uniform thickness over the entire sheet.

Also, the focusing layer resin solution undergoes volumetric shrinkage when the focusing layer resin solution coating is dried, and this shrinkage stress tries to cause the coating to go around to the back side of the glass spheres and form an ideal concentric circle. If the focusing layer 12 could be formed in a uniform thickness at the focal position of the glass spheres, then as shown in FIG. 8B, incident light b1 from the front would be reflected by the metal reflective layer 14 on the back side of the glass sphere focusing layer, and retroreflected as reflected light b2 substantially parallel to the direction of incidence, while incident light c1 that comes in obliquely also would be retroreflected as reflected light c2 substantially parallel to the direction of incidence. In actual practice, however, the focusing layer solution also comes into contact with the fixing layer between the glass spheres, and the focusing layer solution is attracted to the fixing layer in the course of drying, or flows to a lower position under the force of gravity. As a result, the focusing layer resin is hindered from forming a concentric circle, so the back side of the glass spheres ends up being thinner and the lateral sides thicker, forming the focusing layer shown in FIG. 8C.

Specifically, when the focusing layer thickness on the back side of the glass spheres is made to coincide with the focal position of the glass spheres, incident light d1 from the front is retroreflected as reflected light d2 substantially parallel to the direction of incidence, but incident light e1 that comes in obliquely is diverged from the direction of incidence and retroreflected as reflected light e2. Therefore, optimal reflection is only possible at the small incidence angle indicated by β in FIG. 8C.

Also, as the retroreflective sheet (FIG. 8D) proposed in Patent document 4, if the focusing layer is formed such that the lateral sides of the glass spheres cause the incident light to be retroreflected as reflected light g2 that is substantially parallel to the incident light g1, then the problem is that incident light f1 from the front is diverged from the direction of incidence and retroreflected as reflected light f2. Therefore, even though reflective performance can be obtained at a large observation angle, such a product is far from meeting the Japanese Industrial Standards (JIS) or foreign standards for road signs, which require that reflective performance from the front be exhibited at a relatively small observation angle. Accordingly, such products have only limited applications, cannot be used for normal traffic signs, are difficult to use for vehicle license plates and so forth, and still do not meet the practical needs of the market.

As described above, conventional enclosed lens type of retroreflective sheets had high angle dependence and did not adequately ensure wide-angle reflective performance at a large incidence angle and a large observation angle.

In light of this situation, there has been an urgent need for the development of a retroreflective sheet that would meet world standards, including JIS, and provide wide-angle characteristics.

DISCLOSURE OF INVENTION

To solve the above problems encountered in the past, the present invention provides a retroreflective sheet that ensures wide-angle reflective performance with which the incidence angle and observation angle can be increased. The present invention further proposes a retroreflective sheet and an external illumination system with which, even when used in an external distant illumination system, higher reflective performance can be attained than with encapsulated lens type retroreflective sheets having a wide observation angle that have been commercially available in the past.

The retroreflective sheet of the present invention comprises a surface layer including at least one layer, a focusing layer containing glass spheres, and a metal reflective layer on the back side of the focusing layer, wherein the glass spheres are disposed at random locations in the thickness direction of the focusing layer.

The external illumination system of the present invention comprises a sign having a sign face including the above-mentioned retroreflective sheet, and an external illumination source, wherein the distance from the illumination source to the sign face is within a range of at least 1 m and no more than 100 m.

BEST MODE FOR CARRYING OUT THE INVENTION

When the retroreflective sheet of the present invention is viewed in cross section, the glass spheres present in the focusing layer are located at random heights. That is, there are glass spheres touching the surface layer, and there are glass spheres not touching this surface layer, and those that are not touching are not all at the same height locations. This allows light that is incident from a wide-angle location to be retroreflected in substantially that same direction, and affords a wider observation angle.

Figure 7:
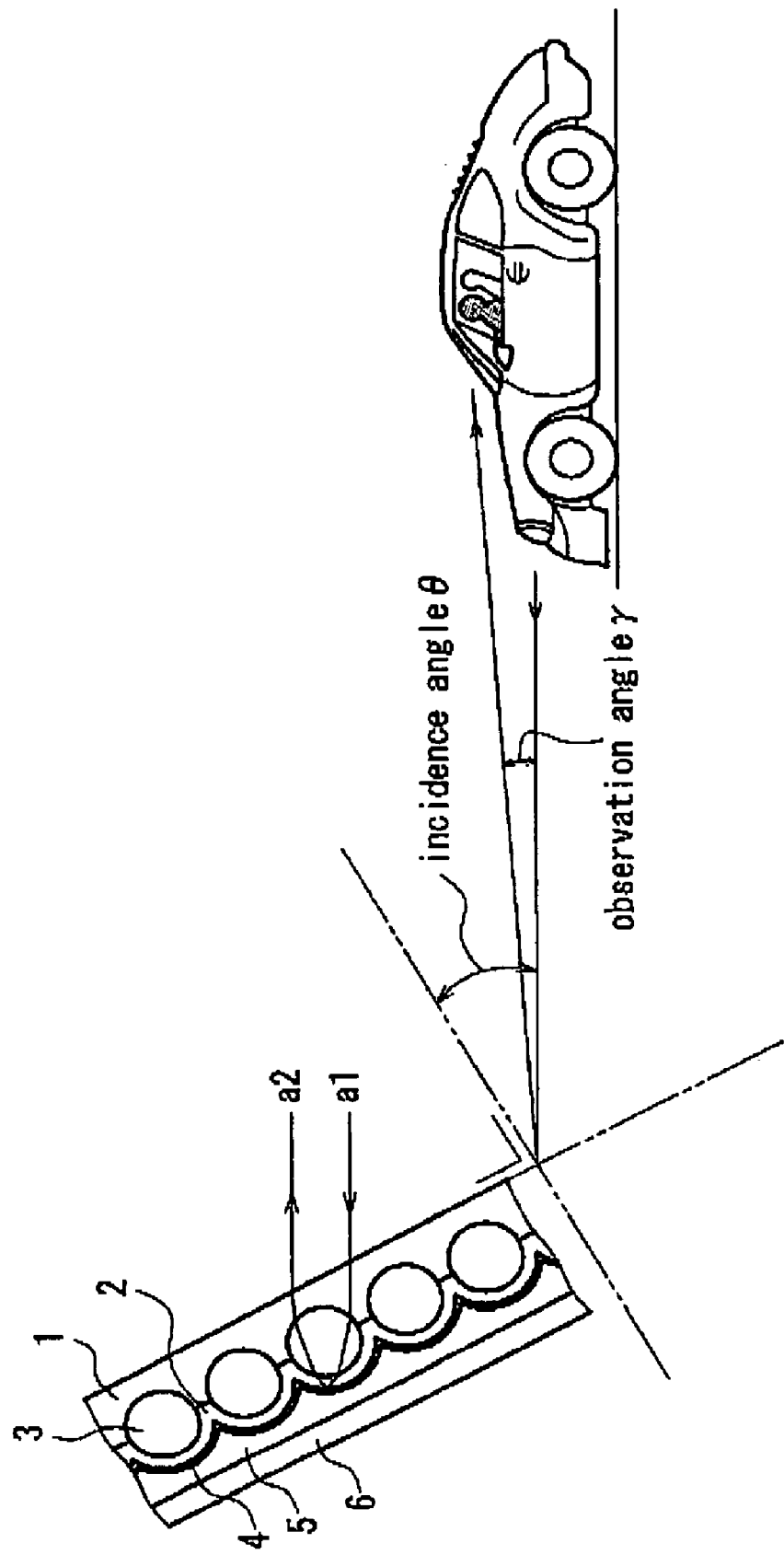
FIG. 7 is a diagram, of a conventional retroreflective sheet used for explaining the observation angle and the incidence angle of the present invention.

The term "observation angle" in the present invention is the angle γ in FIG. 7, and refers to the angle at which reflected light can be observed. "Incidence angle" is the angle θ in FIG. 7, and refers to the angle θ formed by incident light and a perpendicular line that intersects at a right angle with the surface of the retroreflective sheet. In FIG. 7, 1 is a surface film, 2 is a focusing layer, 3 is a glass sphere, 4 is a metal reflective layer, 5 is a pressure sensitive adhesive layer, 6 is a release material, a1 is incident light, and a2 is reflected light.

The glass spheres preferably include a glass sphere group B in contact with the surface layer, and a glass sphere group A located away from the surface layer. This allows the glass sphere group A to exhibit retroreflective performance at a larger observation angle than the observation angle of the glass sphere group B.

Preferably, the glass spheres include a glass sphere group B in contact with the surface layer, and a glass sphere group A located away from the surface layer, the reflective layer of the glass sphere group B being formed at a focus formation position, and the thickness of the focusing layer of the glass sphere group A being less than the thickness of the focusing layer of the glass sphere group B. This allows retroreflective performance to be exhibited at a larger observation angle.

Preferably, the glass spheres include a glass sphere group B in contact with the surface layer, and a glass sphere group A located away from the surface layer, and the focusing layer formed in the form of concentric circles on the glass sphere surfaces of the glass sphere group B has a thickness at which the maximum reflective performance is exhibited at an observation angle of 0.2° and an incidence angle of 5°, the thickness of the focusing layer of the glass sphere group A is less than the thickness of the focusing layer of the glass sphere group B, and the glass sphere group A exhibits retroreflective performance at a larger observation angle than the glass sphere group B.

Preferably, the proportion of glass spheres in contact with the surface layer is from 50 to 90 wt % of the total glass spheres. This meets the standards of countries around the world, including JIS Z 9117, and at the same time provides satisfactory reflective performance at a large observation angle of 2° or more.

Preferably, the refractive index of the glass spheres is within a range of at least 2.10 and no more than 2.40, the glass spheres have a median diameter within a range of at least 35 μm and no more than 75 μm, and at least 80% of the glass spheres have a median diameter within a range of ±10 μm. This is favorable because the focusing layer can be formed concentrically around the glass spheres, and the desired reflective performance will be obtained.

Preferably, the main component of the resin that makes up the focusing layer is a polyvinyl acetal resin. This results in a product that is colorless and transparent, has excellent toughness, flexibility, adhesion to titanium oxide glass, and pigment dispersibility, has good solubility in organic solvents, has functional groups, and can undergo a crosslinking reaction.

Preferably, the polyvinyl acetal resin is a polyvinyl butyral resin with a degree of polymerization of 500 to 1500. This allows the product to be adjusted to a favorable solid content and viscosity.

Preferably, the polyvinyl alcohol units of the polyvinyl butyral resin account for at least 17 wt % and no more than 23 wt %. This allows the curing rate with a curing agent to be adjusted favorably Preferably, the glass transition point (Tg) of the polyvinyl butyral resin is at least 60° C. and no higher than 80° C. This is favorable in terms of forming the focusing layer as a concentric circle on the glass sphere surface.

Preferably, the hydroxyl groups in the polyvinyl alcohol units of the polyvinyl butyral resin have been crosslinked with an amino resin, and the focusing layer is one that does not dissolve when immersed for 1 minute in toluene, for 1 minute in xylene, or for 10 minutes in methanol. This allows printing to be performed using a screen ink or the like containing any of various organic solvents, and since the product will be resistant to gasoline when applied to a vehicle or the like, it can be used favorably as a practical retroreflective sheet.

Preferably, the mixing proportion of the glass spheres and the resin weight of the focusing layer are such that the glass spheres account for 1.5 to 3.7 weight parts per weight part of resin. This ensures sufficient reflective performance.

Preferably, the focusing layer contains a non-silicon-based anti-foaming agent in an amount of 0.01 to 3.0% of the resin weight of the focusing layer. This is favorable because an anti-foaming effect will be achieved while not lowering the adhesion to metal reflective layers.

Preferably, the non-silicon-based anti-foaming agent is an alkyl vinyl ether copolymer. This is favorable because a satisfactory anti-foaming effect will be achieved.

Also, to meet world standards for enclosed lens type retroreflective sheets used in road signs, and to ensure effective nighttime visibility even at an observation angle of 4°, which is approximately twice that of conventional products, and an incidence angle larger than 50°, the retroreflective sheet of the present invention preferably achieves class 1 reflective performance as set forth in JIS Z 9117, and provides the following reflective performance in various colors.

Preferably, a white retroreflective sheet has wide-angle reflective performance in which the reflective performance is at least 0.75 at an observation angle of 2° and an incidence angle of 70°, and the reflective performance is at least 0.50 at an observation angle of 4° and an incidence angle of 70°.

Preferably, a yellow retroreflective sheet has wide-angle reflective performance in which the reflective performance is at least 0.50 at an observation angle of 2° and an incidence angle of 70°, and the reflective performance is at least 0.35 at an observation angle of 4° and an incidence angle of 70°.

Preferably, a red retroreflective sheet has wide-angle reflective performance in which the reflective performance is at least 0.15 at an observation angle of 2° and an incidence angle of 70°, and the reflective performance is at least 0.10 at an observation angle of 4° and an incidence angle of 70°.

Preferably, an orange retroreflective sheet has wide-angle reflective performance in which the reflective performance is at least 0.17 at an observation angle of 2° and an incidence angle of 70°, and the reflective performance is at least 0.11 at an observation angle of 4° and an incidence angle of 70°.

Preferably, a green retroreflective sheet has wide-angle reflective performance in which the reflective performance is at least 0.11 at an observation angle of 2° and an incidence angle of 70°, and the reflective performance is at least 0.08 at an observation angle of 4° and an incidence angle of 70°.

Preferably, a blue retroreflective sheet has wide-angle reflective performance in which the reflective performance is at least 0.04 at an observation angle of 2° and an incidence angle of 70°, and the reflective performance is at least 0.03 at an observation angle of 4° and an incidence angle of 70°.

The retroreflective sheet of the present invention is useful in many different applications, examples of which include traffic signs, guidance signs, warning signs, restriction signs, vehicle license plates, advertising signs, and print photographs. Examples of especially useful applications include those that make use of super-wide-angle retroreflective performance, such as side markings for roadways; line markings for guard rails, guard pipes, and other such protective barriers; curb markings; tunnel markings; cave markings; vehicle markings; train station names; bus stop names; residence markings; vending machine labeling (front and sides); snow pole markings; line markings for wind and snow barriers; railway markings; security signs; construction fence markings; estimated building completion schedule markings; markings for acoustic panels and soundproofing panels; visual guidance markings; markings for river and coastal water levels; and road surface markings. When used in such applications, this sheet is extremely useful because its super-wide-angle retroreflective performance ensures high visibility.

Furthermore, the retroreflective sheet of the present invention offers greater reflective performance than encapsulated lens type retroreflective sheets that were commercially available up to now, or encapsulated lens type retroreflective sheets having wide observation angle characteristics for even larger observation angles, to be specific, 5°, 35°, or 40°. Accordingly, this sheet can also be used in external distant illumination systems, which have been gaining popularity in recent years in road sign applications.

With the present invention, a highly practical retroreflective sheet that supports superwide-angle characteristics can be obtained by adjusting the reflective performance of the individual glass spheres that effect the retroreflection, and thereby dividing them into a glass sphere group whose role is to maintain reflective performance at a small observation angle and up to a large incidence angle, and a glass sphere group whose role is to maintain reflective performance at a larger observation angle and up to a large incidence angle, with each group taking care of its own type of performance.

Specifically, to ensure retroreflective performance at the above-mentioned large incidence angle, the greatest problem is how to form the focusing layer at a constant thickness and concentrically with the glass spheres, and to meet the various world standards, the focusing layer thickness has to be formed accurately at the focus formation position of the glass spheres.

Furthermore, to ensure reflective performance at a larger observation angle and at a larger incidence angle than those set forth in world standards, it is necessary to form the focusing layer in a constant thickness and concentrically with the glass spheres, and for reflective performance to be obtained at a larger observation angle, the focusing layer has to be made slightly thinner at the glass spheres than at the focus formation position of the glass spheres.

It was found out that a retroreflective sheet having the super-wide-angle characteristics needed to satisfy the urgent needs of the market can be obtained by having a single focusing layer contain two types of glass sphere groups that fulfill the roles mentioned above.

The formation of the focusing layer in the process of manufacturing a conventional retroreflective sheet is accomplished by either embedding glass spheres halfway in a surface layer or embedding them halfway in a glass sphere fixing layer provided over the surface layer, coating this product with a focusing layer resin solution, and drying this coating. At this point, the focusing layer resin solution flows down along the glass spheres from their tops to their sides, and the focusing layer is formed in a spherical shape over the hemispherical surfaces of the glass spheres exposed roughly halfway from the surface layer or the glass sphere fixing layer.

The focusing layer resin solution that runs down from the top side of the exposed hemispherical surfaces (that is, the glass spheres) accumulates on the surface layer or glass sphere fixing layer in which the glass spheres are embedded, making the focusing layer thicker on the lateral sides of the glass spheres, which means that the film thickness originally required at the focus formation position of the glass spheres is only formed at a tiny portion near the top of the glass spheres.

In view of this, the inventors examined how the focusing layer thickness could be kept constant and formed concentrically with the glass spheres, whereupon they found out that if the focusing layer is formed without embedding the glass spheres in the surface layer, the resin solution that runs down form the sides of the glass spheres will accumulate from the bottom of the glass spheres, and therefore does not impede the formation of a concentric focusing layer from the top of the glass spheres, and that a focusing layer formed concentrically along the glass spheres has a far greater surface area than in the past.

Specifically, the inventors reached the conclusion that dispersing glass spheres in a focusing layer resin solution and directly coating the surface layer with this solution is useful for forming the above-mentioned concentric focusing layer.

The following are the conditions required to form this concentric focusing layer. First, resins that can be used as the focusing layer are those whose base polymer component is a polyurethane resin, polyvinyl acetal resin, acrylic resin, polyester resin, or the like, and it is favorable to add a curing agent such as an amino resin, epoxy resin, polyisocyanate, or block polyisocyanate and use the resin as a thermosetting type. It is especially favorable to use polyvinyl acetal resin that is colorless and transparent, has excellent pigment dispersibility, adhesion to titanium oxide glass, toughness, and flexibility, has good solubility in organic solvents, has functional groups, and can undergo a crosslinking reaction.

Other factors that can have a major effect include the viscosity of the applied resin solution, the drying conditions, the degree of polymerization of the resin, the solids content of the resin solution, the weight ratio of the resin solids and glass spheres, the type and amount of the functional groups in the resin, a curing agent that reacts with these functional groups, a curing catalyst, and so forth. These conditions will be discussed in detail below.

Next, the glass spheres are divided into a glass sphere group whose role is to maintain reflective performance at a small observation angle and up to a large incidence angle, and a glass sphere group whose role is to maintain reflective performance at a larger observation angle and up to a large incidence angle, with each group taking care of its own type of performance.

Figure 1A:
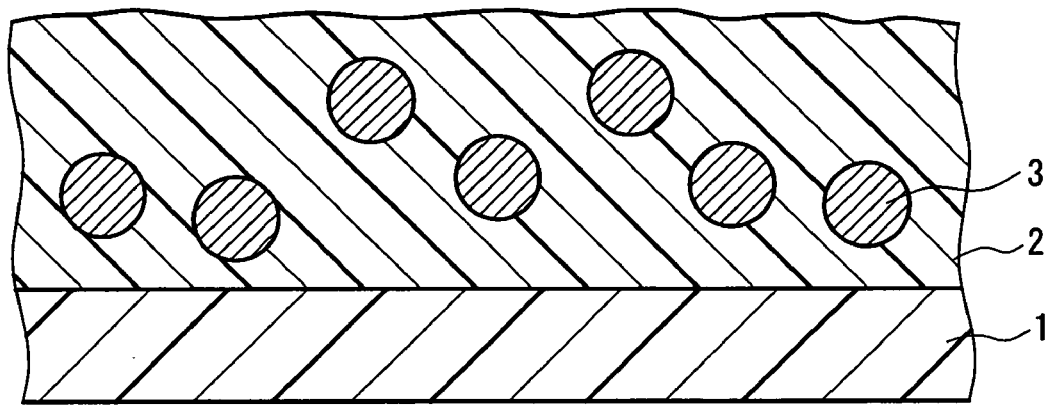
FIG. 1A is a cross-sectional view showing a process for manufacturing the retroreflective sheet in a working example of the present invention.
Figure 1B:
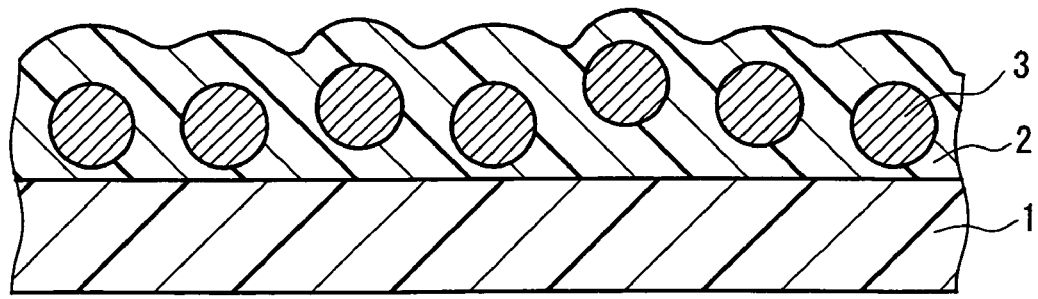
FIG. 1B is a cross-sectional view showing a process for manufacturing the retroreflective sheet in a working example of the present invention.
Figure 1C:
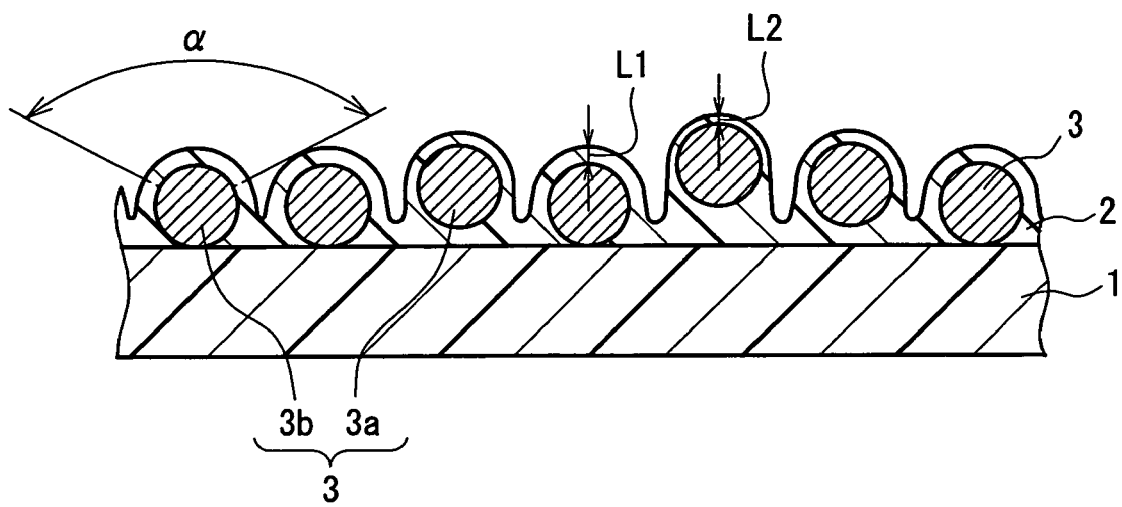
FIG. 1C is a cross-sectional view showing a process for manufacturing the retroreflective sheet in a working example of the present invention.

As shown in FIG. 1A, glass spheres 3 are added to a focusing layer resin solution 2 and thoroughly stirred to disperse the glass spheres uniformly, and a surface layer 1 is coated with the resulting solution. This coating then is allowed to stand at normal temperature for a specific time to remove or burst any bubbles that have become admixed into the coating solution. After this, the solvent is volatilized in a heating and drying step, during which time the glass spheres 3 sink toward the surface layer 1 (FIG. 1B). More specifically, the surface layer 1 is coated in a constant film thickness with the focusing layer resin solution containing the glass spheres 3, by using a knife coater, comma coater, flow coater, or the like. As shown in FIG. 1B, the glass spheres 3 are randomly (irregularly) distributed in the resin coating film (hereinafter referred to as the wet film), uniformly in the thickness direction, and during heating the glass spheres gradually sink toward the surface layer, starting with those closest to the surface layer 1. As shown in FIG. 1C, at the point when 50 to 90 wt %, and preferably 55 to 85 wt %, and even more preferably 60 to 80 wt %, of all the glass spheres are in contact with the surface layer 1, it is preferable for the curing of the focusing layer resin to be promoted and the glass spheres to be fixed so as to halt the settling of the glass spheres. The main role of the glass spheres 3b touching the surface layer 1 is to maintain reflective performance at an observation angle of from 0.2 to 2° and an incidence angle of from 5°, to less than 90°. The main role of the rest of the glass spheres 3a that are not touching the surface layer 1 is to maintain reflective performance at a larger observation angle of from 2° to 4° and an incidence angle of from 5°, to less than 90°. One way to adjust the focusing layer thickness at this point is to apply several thin coats of the focusing layer resin solution and adjust to the optimal focusing layer thickness so a focusing layer thickness at which the maximum reflective performance will be exhibited at an observation angle of 0.2° and an incidence angle of 5° is formed on the glass spheres 3b touching the surface layer 1, but it is better to preset the initial wet film thickness so that the focusing layer is formed in the optimal thickness on the glass spheres 3b.

As the solvent volatilizes in the drying and solidification process, the focusing layer resin solution undergoes volumetric shrinkage in the state as enveloping the glass spheres 3 at a certain position of the glass spheres, so the focusing layer 2 can be formed concentric to the glass spheres. As a result, the region of uniform thickness of the focusing layer is that within the angle α in FIG. 1C, which is wider than β in FIG. 8C.

The film thickness L1 of the focusing layer 2 formed on the glass spheres 3b in contact with the surface layer 1 is greater than the film thickness L2 of the glass spheres 3a not in contact with the surface layer 1, with the thickness L2 decreasing in proportion to the distance from the surface layer 1. The thinner is the film thickness L2, the greater the observation angle at which the glass spheres will exhibit wide-angle reflective performance. Well balanced wide-angle performance is obtained by having these various glass spheres contained.

The wet film thickness preferably is adjusted to from 3.5 to 5.5 times, and even more preferably 3.7 to 5.3 times, and especially 4 to 5 times, the diameter of the glass spheres.

If the wet film thickness is thinner than 3.5 times, there will not be enough time to adjust the glass spheres touching the surface layer to between 50 and 90, wt %, and it will be difficult to control the positions of the glass sphere group B and glass sphere group A into which the reflective performance is divided. If the wet film thickness is thicker than 5.5 times, however, it will take too long to adjust the glass spheres touching the surface layer to between 50 and 90 wt %, the viscosity of the resin will rise too high, and this will hinder forming a focusing layer that is concentric to the glass spheres.

To obtain the optimal focusing layer thickness in the wet film thickness, it is preferable for the solids content of the resin solution to be between 15 and 25 wt %, and even more preferably between 16 and 24 wt %, with a range of 17 to 23 wt % being better yet. It is undesirable for the content to be less than 15 wt % because it will be difficult to form the focusing layer concentric to the glass spheres, but if 25 wt % is exceeded, fine adjustment of the focusing layer thickness will be difficult, and it will be difficult to control reflective performance.

It is good for the glass spheres used here to have titanium oxide as their main component and to have a refractive index of 2.10 to 2.40, and preferably 2.15 to 2.35, and even more preferably 2.20 to 2.30. It is good for the glass spheres to have a median diameter of at least 35 μm and no more than 75 μm, and preferably at least 40 μm and no more than 70 μm. The desired reflective performance will not be obtained below 35 μm, but exceeding 75 μm is undesirable because it will be difficult to form the focusing layer concentric to the glass spheres.

It is good for the resin viscosity during coating to be from 500 to 3000 mPa·S, and preferably 700 to 2800 mPa·S, and even more preferably 900 to 2600 mPa·S. Below 500 mPa·S, the glass spheres dispersed in the focusing layer resin solution will drop too quickly, making it difficult to control the positions of the glass spheres. Furthermore, the resin that runs down the sides of the glass spheres from the top also will move too quickly, with the result that more resin accumulates around the bottom of the glass spheres (on the surface layer side), which is undesirable in that it hinders the resin from being formed concentric to the glass spheres. If 3000 mPa·S is exceeded, it will take too long for the glass spheres to reach the surface layer, the viscosity of the resin solution will rise further, and as a result the glass spheres will not reach the surface layer. This is also undesirable because bubbles cannot be removed from the resin solution.

The degree of polymerization of a polyvinyl butyral resin that satisfies the requirements for solids content and viscosity of the resin solution preferably is 500 to 1500, and even more preferably 600 to 1400, with 700 to 1300 being better yet. If the degree of polymerization is less than 500, the solids content of the resin solution will be too high and it will be difficult to adjust the film thickness, but if 1500 is exceeded, the solids content will be too low and it will be difficult to form the resin concentrically.

It is preferable, in terms of adjusting the curing rate with the curing agent, for the polyvinyl alcohol units of the polyvinyl butyral resin to account for at least 17 wt % and no more than 23 wt %.

Examples of curing agents that promote a crosslinking reaction with the hydroxyl groups in the polyvinyl alcohol units here include amino resins, epoxy resins, polyisocyanates, and block polyisocyanates, but a mixed solvent comprising an alcohol-based solvent and an aromatic solvent most often is used as a solvent that will dissolve a polyvinyl butyral resin. When an alcohol-based solvent is used, using a polyisocyanate or a block polyisocyanate is undesirable because it will affect reactivity adversely, and an amino resin is preferable. A retroreflective sheet that will not dissolve when immersed for 1 minute in toluene, for 1 minute in xylene, or for 10 minutes in methanol upon completion of the curing reaction will be favorable for practical use because this allows printing to be performed using a screen ink or the like containing any of various organic solvents, and the product will be resistant to gasoline when applied to a vehicle or the like.

Preferably, the glass transition point (Tg) of the polyvinyl butyral resin is, at least 60° C. and no higher than 80° C. Below 60° C. is undesirable because heat resistance will be too low during the formation of the focusing layer on the glass spheres, and the resin will flow and cannot be formed concentrically. It is also undesirable for Tg to be over 80° C. because heat resistance will be too high, the resin will not flow well during heating and drying, and it will be difficult to form the focusing layer concentric to the glass spheres.

Preferably, the mixing proportions of the glass sphere weight and the resin solids weight of the focusing layer resin solution in which the glass spheres have been dispersed are such that the glass spheres account for 1.5 to 3.7 weight parts, and even more preferably 1.7 to 3.5 weight parts, and more preferably still 1.9 to 3.2 weight parts, per weight part of resin. An amount under 1.5 weight parts is undesirable because adequate reflective performance cannot be ensured, but exceeding 3.7 weight parts is also undesirable because there will be no space between the beads and it will be difficult to control the positions of the glass spheres in a balanced manner so as to divide the reflective performance of the glass spheres.

Air becomes trapped as bubbles in the resin solution during the mixing of the glass spheres and so forth, and it is preferable to add an anti-foaming agent in order to eliminate these bubbles in a short time after the surface layer has been coated with the resin solution, but it is preferable to use a non-silicon-based anti-foaming agent so as not to compromise adhesion to the metal reflective layer that is applied in a subsequent step. This agent preferably is added in an amount of 0.01 to 3.0 wt % of the resin weight. Of these non-silicon-based anti-foaming agents, the use of an alkyl vinyl ether copolymer is preferred, and it is especially favorable to add an alkyl vinyl ether copolymer in an amount of 0.02 to 2.0 wt % of the resin weight, because this will yield a sufficient anti-foaming effect but will not hamper adhesion to the metal reflective layer.

Figure 1D:
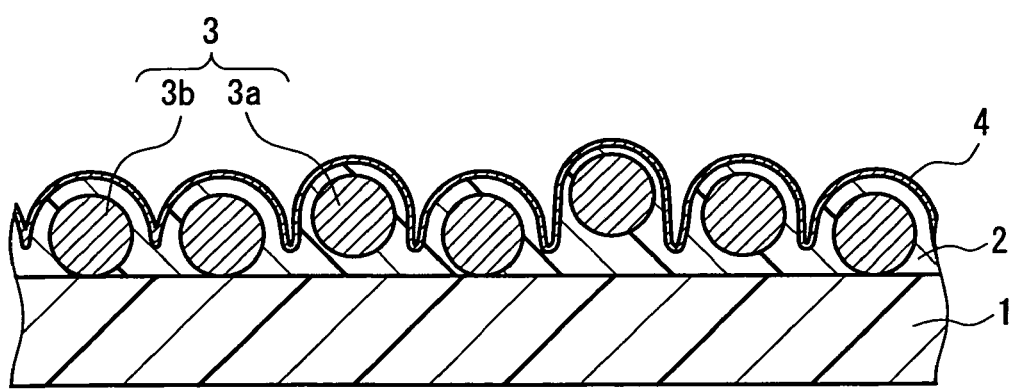
FIG. 1D a cross-sectional view showing a process for manufacturing the retroreflective sheet in a working example of the present invention.
Figure 1E:
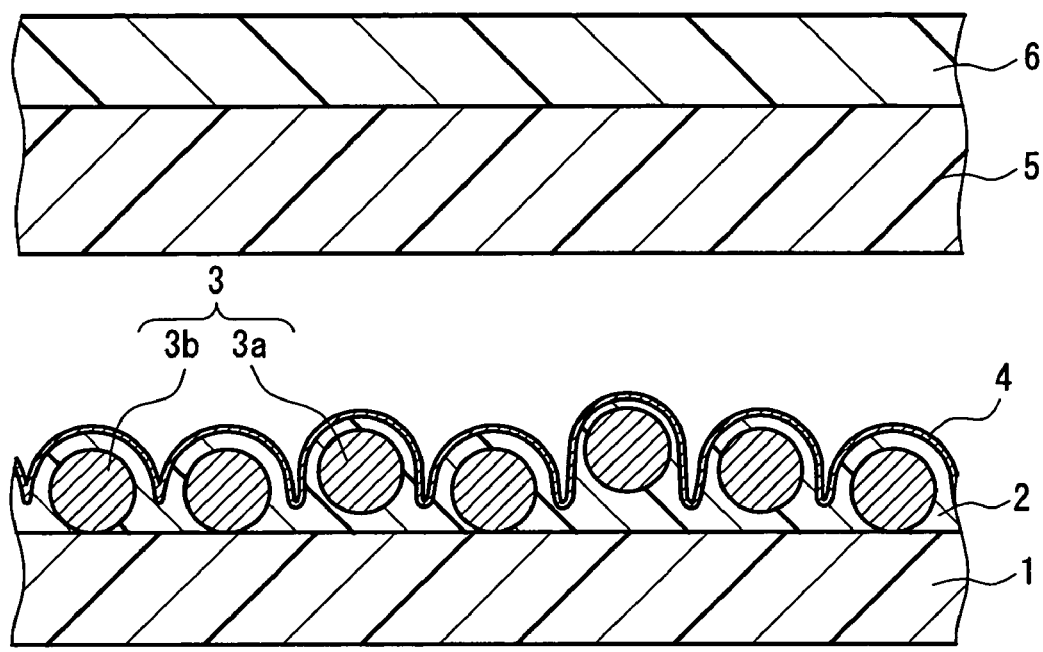
FIG. 1E is a cross-sectional view showing a process for manufacturing the retroreflective sheet in a working example of the present invention.
Figure 1F:
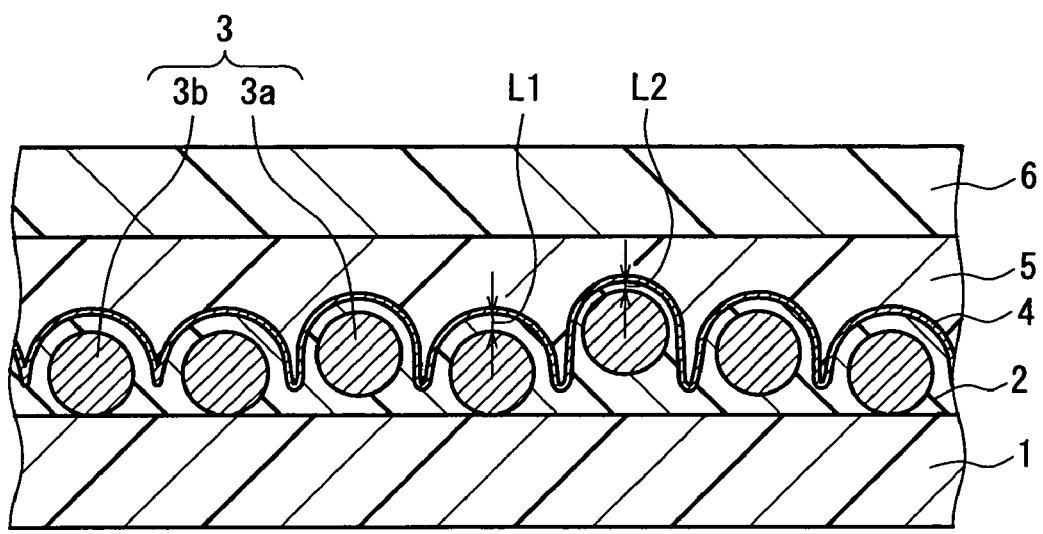
FIG. 1F is a cross-sectional view showing a process for manufacturing the retroreflective sheet in a working example of the present invention.

The steps after FIG. 1C are the same as in a conventional process. First, as shown in FIG. 1D, a metal reflective layer 4 of aluminum or the like is formed on the surface of the focusing layer 2 along the focusing layer 2. Then, as shown in FIG. 1E, a pressure sensitive adhesive layer 5 is formed over a release material 6, and this is pressed over the metal reflective layer 4 to integrate the two, which gives a retroreflective sheet (FIG. 1F).

A retroreflective sheet produced as above includes a surface layer, a focusing layer containing glass spheres, and a metal reflective layer formed on the opposite side of the focusing layer from the surface layer, and the glass spheres are composed of a glass sphere group whose role is to maintain reflective performance at a small observation angle and up to a large incidence angle, and a glass sphere group whose role is to maintain reflective performance at a larger observation angle and up to a large incidence angle. This constitutes the retroreflective sheet of the present invention, which has super-wide-angle reflective performance.

The method for manufacturing the retroreflective sheet of the present invention is to add glass spheres to a focusing layer resin solution, stir thoroughly to uniformly disperse the glass spheres, and coat the surface layer with this solution. The coating then is allowed to stand for a specific time to remove or burst any bubbles that have become admixed into the coating solution. After this, the solvent is volatilized in a drying step, during which time the glass spheres sink towards the surface layer.

At the point when 50 to 90 wt % of all the glass spheres are in contact with the surface layer, the curing of the focusing layer resin is promoted and the glass spheres are fixed so as to halt the movement of the glass spheres during heating. The metal reflective layer is formed over this focusing layer, and the pressure sensitive adhesive layer and the release material are layered over the metal reflective layer.

The surface layer is formed from at least one coating layer and/or a resin sheet. In the case of a resin sheet, it is preferable to form at least one coating layer over the sheet. Examples of the material of the surface layer include fluoro-olefin copolymers containing a reactive functional group, polyester resins, alkyd resins, polyurethane resins, vinyl resins, and acrylic polymers containing a reactive functional group. The coating layer is preferably a composition obtained by blending one of these resins as the base resin component, and a curing agent such as amino resins, epoxy resins, polyisocyanates, and block polyisocyanates, and/or curing catalyst. More specifically, when the surface layer is a polyethylene terephthalate film, for example, one possibility is that a biaxially drawn polyethylene terephthalate film that has been treated for providing easy adhesion by undergoing a corona discharge treatment, resin coating, or the like is coated with a focusing layer resin solution in which the above-mentioned glass-spheres have been dispersed, thereby forming a focusing layer containing glass spheres, while another possibility is that a metal reflective layer is formed over the entire back side of the focusing layer, a release material coated with a layer of pressure sensitive adhesive is applied, and then in the next step a material whose base resin component is a fluoro-olefin copolymer containing a reactive functional group, a polyester resin, an alkyd resins, a polyurethane resin, a vinyl resin, or an acrylic polymers containing a reactive functional group, and to which has been added a curing agent such as an amino resin, an epoxy resin, a polyisocyanate, or a block polyisocyanate, and/or curing catalyst is formed over a biaxially drawn polyethylene terephthalate film to create a second surface layer. When one of the above-mentioned fluoro-olefin copolymers is used as a second surface layer, it is preferable if an image-forming resin layer containing from 0 to 20 wt % of a low-molecular weight compound with a molecular weight of approximately 1300 or less is formed in between the fluoro-olefin copolymer and the above-mentioned biaxially drawn polyethylene terephthalate film, because a sublimable dye can be made to penetrate into the image-forming resin layer and color from the second surface layer, and the dye can be prevented from bleeding through the image-forming resin layer. In this case, it is preferable if the shrinkage of the above-mentioned biaxially drawn polyethylene terephthalate film in the film winding direction upon being heated for 30 minutes at 150° C. is 1.0% or less, because this will suppress wrinkles and streaks that otherwise would be caused by heating at a temperature of 150 to 190° C. when the sublimable dye is sublimated and made to penetrate into the image-forming resin layer and color.

Long-term durability can be enhanced further if the composition used to form the surface layer, or the composition used to form the image-forming resin layer contains as needed a UV absorbent, light stabilizer, or antioxidant, which can be added individually or in combinations. A conventional UV absorbent can be used for this purpose, typical examples of which include those based on benzophenone, benzotriazole, cyanoacrylate, salicylate, oxalic acid anilide, or the like. Light stabilizers that can be used include hindered amine compounds. Antioxidants that can be used include hindered phenol compounds, amine-based antioxidants, sulfur-based antioxidants, and other such known compounds. However, the appearance of phases due to phase separation from the transparent resin, bleed-out, volatilization during the heat treatment performed to sublimate the sublimable dye and cause it to penetrate into the image-forming resin layer, and other such problems will be pronounced if a UV absorbent, light stabilizer, or antioxidant based on a low-molecular weight compound is used, so it is preferable to use a high-molecular weight type of UV absorbent, light stabilizer, or antioxidant.

In addition to the above methods, it is also possible to add any of the various curing agents and/or curing catalysts mentioned above to a resin solution to which the resin composition used for the surface layer, and the various UV absorbents, light stabilizers, antioxidants, and so forth have been added, use the resulting solution to coat a biaxially drawn polyethylene terephthalate film that has not been treated for providing easy adhesion, heat and dry the coating to produce a surface layer, and coat this with a focusing layer resin solution in which the above-mentioned glass spheres have been dispersed, to form a focusing layer. In this case, after the final step of layering the pressure sensitive adhesive and release material has been completed, the biaxially drawn polyethylene terephthalate film is peeled off to complete the retroreflective sheet of the present invention.

If needed, it is also possible to build up coats of various kinds of synthetic resin used for the surface layer over the above-mentioned polyethylene terephthalate film that has been treated for providing easy adhesion, heat and dry the coating, and then coat this surface layer with a focusing layer resin solution in which glass spheres have been dispersed. In this case, the biaxially drawn polyethylene terephthalate film that has been treated for providing easy adhesion is not peeled off, and is instead left on the final product as part of the surface layer.

Water repellency will be improved if a fluoro-olefin copolymer composition is used as the above-mentioned resin composition for forming the surface resin layer, in which case there will be a greater contact angle between the surface layer and any water drops that cling to the surface layer in the rain, and surface tension will bring these drops closer to spherical in shape. Any light rays that are incident on the surface of the retroreflective sheet at this point will be refracted upon passing through the water drops, and the light rays will be incident on the retroreflective sheet at a smaller incidence angle than the incidence angle with respect to the surface of the retroreflective sheet prior to being incident on the water drops. Because of this effect, it is preferable to use a fluoro-olefin copolymer composition as the resin composition for forming the surface resin layer, because when light of a relatively large incidence angle is projected onto the retroreflective sheet surface, the reflective brightness in the rain will be markedly higher than that in clear weather. Since traffic accidents are particularly likely to occur in the rain, this is preferable in terms of improving the effect of preventing traffic accidents.

The surface layer used in the present invention is coated with a focusing layer resin solution in which glass spheres have been dispersed, this coating is heated and dried, and 50 to 90 wt % of the glass spheres are allowed to settle until coming into contact with the surface layer, but the individual glass spheres that settle to the surface layer arrive at different times, and it is important that the settling of the glass spheres that touch the surface layer first should be stopped at the position where the glass spheres come into contact with the surface layer, so that they do not sink any further into the interior of the surface layer.

What is required to accomplish this is, of course, that the curing of the focusing layer be promoted to suppress the settling of the glass spheres, but since the glass spheres settle at different times as mentioned above, to prevent the glass spheres that arrive first at the surface layer from sinking in any further, the surface layer needs to have enough resistance to prevent the glass spheres from sinking in. The first performance condition required for this resistance is that the surface layer does not dissolve upon coming into contact with the solvent used in the focusing layer solution. The surface layer also needs to have enough heat resistance so that it will not soften so much that the glass spheres sink into the surface layer at the temperature range in the drying and curing of the focusing layer resin.

This is because if the glass spheres did sink further into the surface layer, there would be a shift in the individual positions of the 50 to 90 wt % of the glass spheres that are charged with handling the reflective performance at a relatively small observation angle, and the desired reflective performance could not be attained. As a result of various studies, the inventors confirm that the desired reflective performance can be attained, and a focusing layer that is concentric to the glass spheres can be formed, by ensuring that no more than 10% of the diameter of the glass spheres sinks into the surface layer.

Examples of the resin that makes up the pressure sensitive adhesive layer of the present invention include acrylic resins and rubber-based resins, such as natural rubber and synthetic rubber. It is particularly favorable for the acrylic resin to be a macromolecular acrylic resin containing an acrylic prepolymer and/or an acrylate copolymer, or a modified acrylic resin in which a monomer that imparts cohesive strength and a pressure sensitive adhesive have been added to one of the above-mentioned acrylic resins.

A retroreflective sheet with no coloration can be obtained by using a clear paint containing no pigment or dye for the paints used to form the various layers of the retroreflective sheet of the present invention, but a colored retroreflective sheet also can be obtained by using a colored paint containing a pigment or dye for the paints that form the various layers. Examples of known pigments that can be used to obtain such a colored paint include Phthalocyanine Blue, Phthalocyanine Green, Quinacridone Red, Hanza Yellow, Perinone Orange, and other such organic pigments, and iron oxide red, iron oxide yellow, titanium white, cobalt blue, and other such inorganic pigments.

The metal reflective layer is formed from one of the following metals, and while its thickness will vary with the metal being used, it is from 5 to 200 nm, and preferably 10 to 100 nm. If the thickness of the metal reflective layer is less than 5 nm, the metal reflective layer will not have adequate hiding power, and therefore will not fulfill its role as a reflective layer, but it is also undesirable for the thickness to be greater than 200 nm because cracks will tend to develop in the metal reflective layer, and such a thickness also drives up the cost. There are no particular restrictions on how the metal reflective layer is provided, and any ordinary method such as vapor deposition, sputtering, transfer, plasma process, or the like can be employed. Vapor deposition and sputtering are particularly favorable in terms of ease of work. Neither are there any particular restrictions on the metal used in forming the metal reflective layer, but examples include aluminum, gold, silver, copper, nickel, chromium, magnesium, zinc, and other such metals. Of these, when ease of work, ease of forming the metal reflective layer, optical reflective efficiency, durability and other such factors are taken into account, aluminum, chromium, and nickel are particularly favorable. The metal reflective layer also may be formed from an alloy composed of two or more different metals.

The conditions for the drying performed after application of paint for forming the surface layer and the focusing layer containing the glass spheres are determined such that the desired state can be achieved, according to the type and added amount of base resin used as the paint raw material, reactive functional group in the base resin, curing agent and curing catalyst, and the type of solvent.

Figure 12:
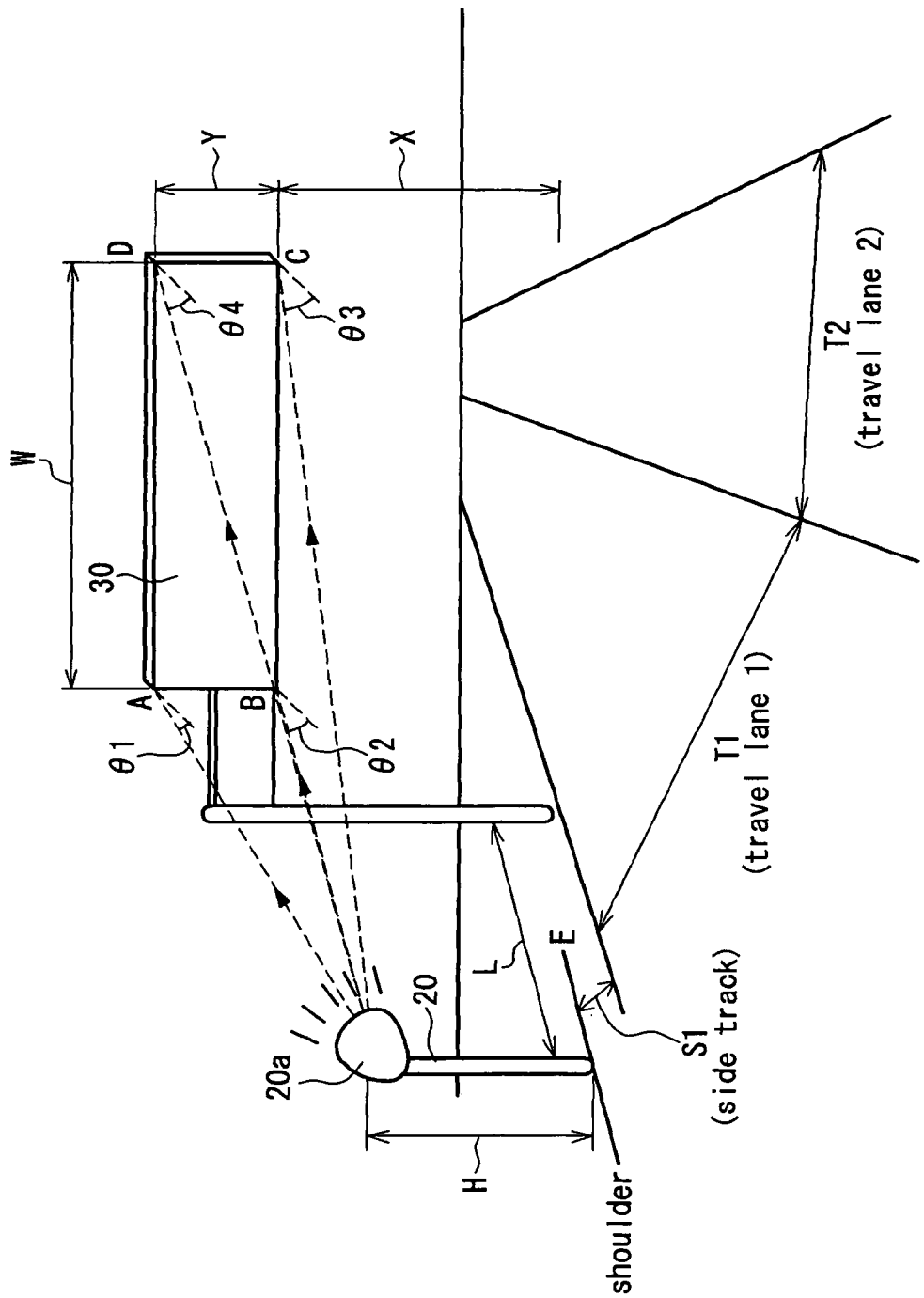
FIG. 12 is a diagram of the external illumination system in a working example of the present invention.

FIG. 12 illustrates a preferred embodiment of the present invention, which is installed on an ordinary freeway. In FIG. 12, T1 and T2 are first and second travel lanes, S1 is a side track (e.g., offside lane), and E is the shoulder of the roadway. W is the lateral width of a sign 30. The sign face is the super-wide-angle retroreflective sheet of the present invention. A illumination source 20 preferably is installed at the shoulder of the roadway, and is equipped with a flood light 20a mounted at the top of the illumination source 20, which radiates reflection light. X is the height from the ground to the bottom of the sign face, Y is the height of the sign face itself above ground, L is the horizontal distance between the illumination source 20 and the road sign 30, and H is the height of the flood light 20a of the illumination source 20 from the ground. The dashed lines indicate the path of the light radiated from the flood light 20a toward the road sign 30. The optical path forms incidence angles θ1, θ2, θ3, and θ4 at the four corners A, B, C, and D of the road sign 30. The road sign 30 preferably is substantially at a right angle to the travel lanes T1 and T2.

With the external illumination system of the present invention, the distance from the illumination source to the sign face is within a range of at least 1 m and no more than 100 m. To lower operating costs by effectively utilizing the amount of light emitting by the illumination source, the illumination source preferably is installed so that the distance from the illumination source to the sign face is shorter, but the distance should be set so as to obtain effective reflective performance, taking into account the incidence angles and observation angles, the size of the sign, and the installation height of the sign face within the above range.

The illumination source preferably radiates light that is incident on the sign face at an incidence angle of at least 0° and no more than 50°, and the reflective performance preferably is at least 0.07 at an observation angle of 35° when reference light A whose color temperature is 2856 K is incident at an incidence angle of 35°. Here, "incidence angle" refers to the angle formed by the irradiation axis of projected light and the face center normal line of the retroreflective sheet, "observation angle" refers to the angle formed by the irradiation axis of projected light and the observation axis, and "reflective performance" refers to a coefficient calculated from the following equation:

retroreflective coefficient $R' = I/ES \cdot A$

R': retroreflective coefficient

ES: illuminance (1x) on a plane perpendicular to the incident light when light is incident at a center position of a test piece A: test piece surface area ($m^2$)

I: calculated from the following equation at the luminosity (Cd) toward the observation axis produced by a test piece $I = Er \cdot d^2$ where Er is the illuminance (1x) on a light receptor, and d is the distance (m) between the test piece surface center and the light receptor.

When the sign face is illuminated externally with the reference light A whose color temperature is 2856K, it is preferable for the reflective performance at an observation angle of 5° and an incidence angle of 50° to be at least 0.5, and for the reflective performance at an observation angle of 40° and an incidence angle of 50° to be at least 0.055.

Because the sign face has such excellent reflective performance even at a larger incidence angle and a larger observation angle, the illumination source can be installed closer, and the luminosity of the illumination source can be reduced, which keeps operating costs down.

As described above, the retroreflective sheet of the present invention affords good retroreflection even when light is incident from a wide-angle position, and the observation angle can be increased. It also has retroreflective performance that meets the road signs standards for enclosed lens-type retroreflective sheets around the world, and allows adequate retroreflective performance to be maintained even at an incidence angle that is greater than the 50° specified in standards. Specifically, a glass sphere group whose role is to maintain adequate retroreflective performance at an observation angle of 2° or less and at an incidence angle greater than 50°, and a glass sphere group whose role is to maintain retroreflective performance at an observation angle greater than the 2° set forth in the standards and at an incidence angle greater than 50°, both are contained in the same focusing layer, thereby dividing the glass spheres into two groups each having its own role, so wide-angle retroreflective performance can be maintained even at an incidence angle that is larger than 50° and at a large observation angle of 4°, which is approximately twice that of conventional products. Furthermore, even when this sheet is used in an external illumination system, it exhibits higher reflective performance than conventional encapsulated lens type retroreflective sheets having wide observation angle characteristics that are on the market.

WORKING EXAMPLES

The present invention will now be described through working examples. The steps described above for FIGS. 1A to 1F are employed in the following working examples. All "parts" and "%" indicating mixing proportions in the working examples refer to weight parts and weight percent unless otherwise specified.

The measurement tests conducted in the working examples and comparative examples were conducted by the following methods.

(1) Reflective Performance

A luminance meter (made by Topcon) was used, and reflective performance was measured according to the method for measuring reflective performance in JIS Z 9117. Reflective performance was measured for various combinations of observation angle and incidence angle.

(2) Method for Measuring Proportion of Glass Spheres in Contact with First Surface Layer The proportions of the glass sphere group A and glass sphere group B were measured by using a stereoscopic shape measurement microscope (made by Keyence), an optical microscope (made by Nikon) or so on to analyze the cross sectional structure of the sheet.

Working Example 1

An annealed biaxially drawn polyethylene terephthalate film used as a first surface layer (made by Teijin DuPont Film; trade name MX534; shrinkage of 0.3% in the film winding direction upon being heated for 30 minutes at 150° C.; film thickness of 97 μm) was coated with the following glass sphere-dispersed resin solution (used as the focusing layer).

(1) 75.0 parts polyvinyl butyral resin solution (degree of polymerization: 680; polyvinyl alcohol unit content: 23 wt %; glass transition point: 66° C.; solids content: 21%; n-butanol/toluene ratio: 1:1)

(2) 3.3 parts Super Beckamine J-820-60 (made by Dainippon Ink & Chemicals; butylated melamine resin; solids content: 60%)

(3) 0.2 part Beckamine P-198 (made by Dainippon Ink & Chemicals; curing accelerator; acid value: 400)

(4) 0.5 part BYK-053 (made by BYK Chemie Japan; alkyl vinyl ether copolymer; anti-foaming agent)

(5) 7.0 parts Polysider W-360-ELS (made by Dainippon Ink & Chemicals; macromolecular plasticizer)

(6) 7.6 parts toluene (7) 7.6 parts n-butanol (8) 68.0 parts glass spheres (median diameter: 50 μm, containing at least 90% within ±10 μm; refractive index: 2.25±0.05)

The viscosity during application of the above-mentioned blended resin (excluding the glass spheres) paint was 1900 mPa·s.

The glass sphere-dispersed resin solution was applied to the first surface layer, adjusting the wet film thickness so that the focusing layer would be formed at the focus position of the glass spheres in contact with the first surface layer (a dry film thickness of approximately 13 to 14 μm from the tops of the glass spheres).

After this, the coating was dried for about 5 minutes at normal temperature, then dried for 5 minutes at 100° C. in the next step, and then heated and dried for 10 minutes at 140° C. to cure the focusing layer resin.

Next, aluminum was applied as a metal reflective layer by vacuum vapor deposition over the focusing layer in a film thickness of 80 nm.

100 weight parts of Finetack SPS-1016 (an acrylic pressure sensitive adhesive made by Dainippon Ink & Chemicals) and 1 weight part of DN-750-45 (a crosslinking agent made by Dainippon Ink & Chemicals) were made into a solution, which was used to coat the silicon-coated side of a separately prepared release paper that had undergone silicon coating, and this product was dried for 5 minutes at 100° C. to produce a pressure sensitive adhesive layer with a thickness of 50 μm.

The pressure sensitive adhesive layer side and the metal reflective layer side then were stuck together to obtain the final product. Approximately 67% of the glass spheres were touching the first surface layer at this point.

Further, the focusing layer did not dissolve even when the intermediate product (prior to the application of the metal layer) was immersed for 1 minute in toluene, for 1 minute in xylene, or for 10 minutes in methanol.

Working Example 2

An annealed biaxially drawn polyethylene terephthalate film (made by Teijin DuPont Film; trade name MX534; shrinkage of 0.3% in the film winding direction upon being heated for 30 minutes at 150° C.; film thickness of 97 μm) was coated with the following glass sphere-dispersed resin solution.

(1) 98.0 parts polyvinyl butyral resin solution (degree of polymerization: 1100; polyvinyl alcohol unit content: 18 wt %; glass transition point: 76° C.; solids content: 16%; n-butanol/toluene ratio: 1:1)

(2) 3.0 parts Beckamine P-196-M (made by Dainippon Ink & Chemicals; butylated urea resin; solids content: 60%)

(3) 0.1 part Beckamine P-198 (made by Dainippon Ink & Chemicals; curing accelerator; acid value: 400)

(4) 0.5 part BYK-053 (made by BYK Chemie Japan; alkyl vinyl ether copolymer; anti-foaming agent)

(5) 2.0 parts Polysider W-360-ELS (made by Dainippon Ink & Chemicals; macromolecular plasticizer)

(6) 2.0 parts DIDP (phthalic acid ester; plasticizer)

(7) 8.0 parts toluene (8) 8.0 parts n-butanol (8) 60.0 parts glass spheres (median diameter: 50 μm, containing at least 90% within ±10 μm; refractive index: 2.25±0.05)

The viscosity during application of the above-mentioned blended resin (excluding the glass spheres) paint was 1100 mPa·s.

Just as in Working Example 1, the glass sphere-dispersed resin solution was applied to the surface layer, adjusting the wet film thickness so that the focusing layer would be formed at the focus position of the glass spheres in contact with the first surface layer.

After this, the coating was dried for about 3 minutes at normal temperature, then dried for 3 minutes at 100° C. in the next step, and then heated and dried for 5 minutes at 150° C. to cure the focusing layer resin.

Next, aluminum was applied as a metal reflective layer by vacuum vapor deposition over the focusing layer in a film thickness of 80 nm.

100 weight parts of Finetack SPS-1016 (an acrylic pressure sensitive adhesive made by Dainippon Ink & Chemicals) and 1 weight part of DN-750-45 (a crosslinking agent made by Dainippon Ink & Chemicals) were made into a solution, which was used to coat the silicon-coated side of a separately prepared release film that had undergone silicon coating (made by Teijin DuPont Film; trade name A-31; shrinkage of 0.4% in the film winding direction upon being heated for 30 minutes at 150° C.), and this product was dried for 5 minutes at 100° C. to produce a pressure sensitive adhesive layer with a thickness of 50 μm.

The pressure sensitive adhesive layer side and the metal reflective layer side then were stuck together.

Then, the first surface layer was coated with the following resin composition such that the dry film thickness would be approximately 30 μm, and heating and drying were performed for about 10 minutes at about 140° C. to obtain an image-forming resin layer.

An example of the resin composition is a blend of approximately 100 parts Burnock D6-439 (made by Dainippon Ink & Chemicals; alkyd resin; hydroxyl value of solids: 140; nonvolatile content: 80%), approximately 82 parts Burnock DN-980 (curing agent made by Dainippon Ink & Chemicals; polyisocyanate prepolymer, nonvolatile content: 75%), approximately 1 part Tinuvin 900 (UV absorbent made by Ciba-Geigy Chemicals), and approximately 1 part Tinuvin 292 (antioxidant made by Ciba-Geigy Chemicals). The resulting image-forming resin layer contained less than 5% low-molecular weight compounds with a molecular weight of approximately 1300 or less.

The image-forming resin layer then was coated with the following resin composition so that the dry film thickness would be approximately 20 μm, and this product was heated and dried for about 10 minutes at about 140° C. to obtain a second surface layer.

Fluoronate K-703 (made by Dainippon Ink & Chemicals; weight average molecular weight: 40,000; hydroxyl value of solids: 72; nonvolatile content: approximately 60%) was used as a fluororesin, Burnock DN-950 was used as a curing agent, Tinuvin 900 was used as a UV absorbent, and Tinuvin 292 was used as an antioxidant. The blend proportions of the resin composition used for the second surface layer here in Working Example 2 were approximately 100 parts Fluoronate K-703, approximately 25 parts Burnock DN-950, approximately 1 part Tinuvin 900, 15 parts Dicton White A-5260 (titanium oxide; solids content: 75%), and approximately 1 part Tinuvin 292.

With the super-wide-angle retroreflective sheet produced in this manner, a sublimable dye could be made to penetrate into the image-forming resin layer and color from the second surface layer by heating according to a sublimation dyeing method. Also, bleeding of the dye from the image-forming resin layer was tested for 2000 hours according to the sunshine accelerated weather resistance test set forth in JIS Z 9117, but the results were good, with no dye bleed occurring.

Approximately 78% of the glass spheres contained in the retroreflective sheet produced in Working Example 2 were in contact with the first surface layer.

Further, the focusing layer did not dissolve when the intermediate product (prior to the application of the metal layer) was immersed for 1 minute in toluene, for 1 minute in xylene, or for 10 minutes in methanol.

Comparative Example 1

A surface layer resin composition was prepared from 100 parts Bekkolite M-6401-50 (made by Dainippon Ink & Chemicals; polyester resin), 20 parts Super Beckamine J-820-60, and 1 part Beckamine P-198.

This composition was used to coat a support film so that the dry film thickness would be 50 µm, and the coating was dried for 5 minutes at 140° C. to obtain a surface layer.

Figure 8A:
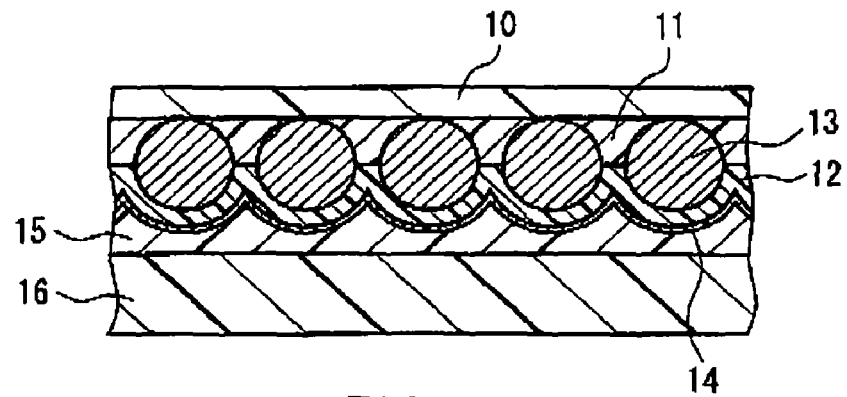
FIGS. 8A to 8D are a cross-sectional view and diagrams of a conventional enclosed lens type retroreflective sheet.
Figure 8B:
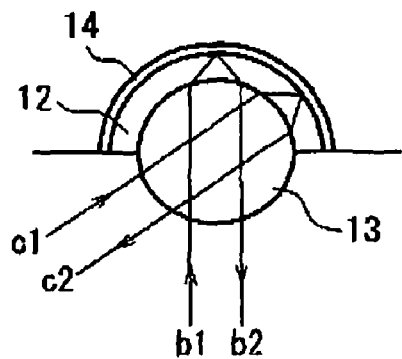

Next, a resin composition for a glass sphere fixing layer was prepared from 100 parts Bekkolite M-6401-50, 10 parts Super Beckamine J-820-60, and 0.5 part Beckamine P-198. This composition was used to coat the surface layer so that the dry film thickness would be approximately 70% of the diameter of the glass spheres, and this coating was dried at normal temperature to volatilize the solvent, after which the glass spheres were embedded, and the coating was dried for 5 minutes at 140° C. Highly refractive glass beads whose main component was titanium oxide and which had a refractive index of 2.23 and a diameter of approximately 55 to 65 µm were used as the glass spheres. The glass spheres were embedded as shown in FIG. 8A.

Next, a resin composition for a focusing layer was prepared from 100 parts Burnock L8-974 (polyurethane resin made by Dainippon Ink & Chemicals) and 10 parts Super Beckamine J-820-60.

This resin composition was applied such that the dry film thickness of the focusing layer built up on the top of the back side of the glass spheres would be approximately 15 µm, and the coating was dried for 10 minutes at 100° C., and then dried for another 10 minutes at 140° C.

Figure 8C:
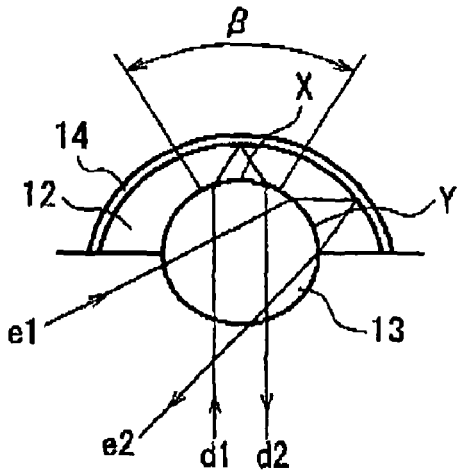
Figure 8D:
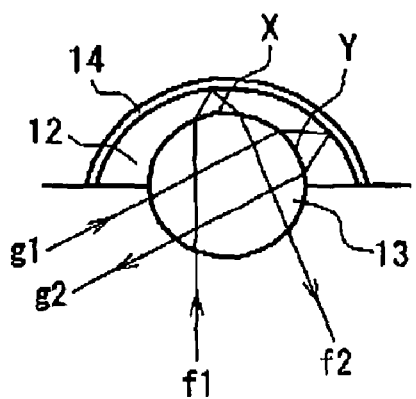

Next, aluminum was applied as a metal reflective layer by vacuum vapor deposition over the focusing layer in a film thickness of 60 nm, thereby producing a retroreflective sheet having the structure shown in FIG. 8C.

100 weight parts Finetack SPS-1016 (made by Dainippon Ink & Chemicals) and 1 weight part DN-750-45 (made by Dainippon Ink & Chemicals) were made into a solution, which was used to coat the silicon-coated side of a separately prepared release paper that had undergone silicon coating, and this product was dried for 5 minutes at 100° C. to produce a pressure sensitive adhesive layer with a thickness of 35 µm.

The pressure sensitive adhesive layer side and the metal reflective layer side then were stuck together, after which the support film was peeled off to obtain a conventional enclosed lens type of retroreflective sheet.

Comparative Example 2

In Comparative Example 1, a resin composition for a focusing layer was applied so that the dry film thickness of the focusing layer built up on the top of the back side of the glass spheres would be approximately 15 µm, but in Comparative Example 2, the approximately 15 µm thickness was changed to approximately 12 µm so as to increase the reflective performance at a large observation angle. Everything else was the same as in Comparative Example 1.

This constitution corresponds to the enclosed lens type of wide-angle retroreflective sheet disclosed in Patent Document 4.

Table 1 below shows the class 1 reflective performance set forth in JIS Z 9117 and the measurement results for the observation angle and incidence angle of the retroreflective sheets manufactured as above.

Although not listed in Table 1, the reflective performance at an observation angle of 20' (0.33°) and incidence angles of 5°, 30°, and 40° was 65, 53, and 42, respectively, with the retroreflective sheet of Working Example 1, and was 77, 65, and 51, respectively with that of Working Example 2. The class 1 reflective performance set forth in JIS Z 9117 is 50, 24, and 9.0, respectively, which means that the retroreflective sheets of Working Examples 1 and 2 comply with the class 1 reflective performance set forth in JIS Z 9117.

Comparative Example 3

A commercially available encapsulated lens type retroreflective sheet having wide observation angle characteristics and used in the sign illumination system disclosed, in Patent Document 5 (made by 3M; a high-intensity wide-angle retroreflective sheet, HV-8100, white) was used as Comparative Example 3, and was compared for reflective performance with the retroreflective sheet of Working Example 1 of the present invention. The numerical values are given in Table 2.

The irradiating light in Tables 1 and 2 is reference light A whose color temperature is 2856K.

Working Example 3

A glass sphere-dispersed resin solution for forming a focusing layer was produced in the same manner as in Working Example 1. Then, to product yellow, red, orange, green, and blue retroreflective sheets, the following colorants were added for each color to the glass sphere-dispersed resin solution for forming a focusing layer.

(1) Glass sphere-dispersed resin solution for forming a yellow focusing layer: 0.2 g of a 20% toluene/N-butanol (1/1) solution of AWB-CP201 Orange (made by Nikko Bics; pigment concentration: 40%) and 3.5 g of a 20% toluene/N-butanol (1/1) solution of AWB-CP310 Yellow (made by Nikko Bics; pigment concentration: 50%)

(2) Glass sphere-dispersed resin solution for forming a red focusing layer: 5.5 g of a 20% toluene/N-butanol (1/1) solution of AWB-CP102 Red (made by Nikko Bics; pigment concentration: 50%)

(3) Glass sphere-dispersed resin solution for forming an orange focusing layer: 4.9 g of a 20% toluene/N-butanol (1/1) solution of AWB-CP201 Orange (made by Nikko Bics; pigment concentration: 40%)

(4) Glass sphere-dispersed resin solution for forming a green focusing layer: 0.5 g of a 20% toluene/N-butanol (1/1) solution of AWB-CP310 Yellow (made by Nikko Bics; pigment concentration: 50%) and 8.0 g of a 20% toluene/N- butanol (1/1) solution of AWB-CP400 Green (made by Nikko Bics; pigment concentration: 50%)

(5) Glass sphere-dispersed resin solution for forming a blue focusing layer: 0.14 g of a 20% toluene/N-butanol (1/1) solution of AWB-CP102 Red (made by Nikko Bics; pigment concentration: 50%) and 7.5 g of a 20% toluene/N-butanol (1/1) solution of AWB-CP650 Blue (made by Nikko Bics; pigment concentration: 45%)

Retroreflective sheets of different colors were produced in the same manner as in Working Example 1 using the above-mentioned glass sphere-dispersed resin solutions for forming a focusing layer of each color. Table 3 shows the reflective performance at that time.

The color of these reflective sheets was measured by the method set forth in JIS Z 9117-7.2, and as a result, all the colors were within the range of the color coordinates set forth in Table 2 of JIS Z 9117-4.(1).

TABLE 1

| Observation angle | Incidence angle | JIS class 1 standard | Working Example 1 | Working Example 2 | Comp. Example 1 | Comp. Example 2 |
|---|---|---|---|---|---|---|
| 0.2° | +5° | 70 | 88 | 110 | 104 | 30 |
| | +30° | 30 | 66 | 85 | 55 | 17 |
| | +40° | 10 | — | — | — | — |
| | +50° | — | 34 | 42 | 9.5 | 13 |
| | +70° | — | 7.1 | 8.5 | 0.4 | 3.0 |
| | +80° | — | 0.9 | 1.1 | 0.01 | 0.4 |
| 2.0° | +5° | 5.0 | 8.4 | 6.8 | 7.2 | 4.8 |
| | +30° | 2.5 | 6.6 | 5.3 | 5.6 | 4.6 |
| | +40° | 1.5 | — | — | — | — |
| | +50° | — | 5.5 | 4.4 | 2.6 | 5.0 |
| | +70° | — | 1.4 | 1.1 | 0.6 | 1.8 |
| | +80° | — | 0.5 | 0.4 | 0.04 | 0.3 |
| 4.0° | +5° | — | 3.8 | 2.2 | 2.4 | 1.6 |
| | +30° | — | 3.1 | 2.0 | 2.3 | 1.5 |
| | +50° | — | 2.6 | 1.7 | 1.3 | 1.4 |
| | +70° | — | 1.1 | 0.8 | 0.2 | 0.8 |
| | +80° | — | 0.3 | 0.2 | 0.01 | 0.2 |

TABLE 2

| Observation angle | Incidence angle | JIS class 1 standard | Working Example 1 | Comp. Example 3 |
|---|---|---|---|---|
| 5° | +5° | — | 1.386 | 0.867 |
| | +30° | — | 1.099 | 0.545 |
| | +40° | — | 1.017 | 0.391 |
| | +50° | — | 0.974 | 0.267 |
| 35° | +5° | — | 0.189 | 0.133 |
| | +30° | — | 0.144 | 0.094 |
| | +40° | — | 0.100 | 0.074 |
| | +50° | — | 0.069 | 0.047 |
| 40° | +5° | — | 0.154 | 0.121 |
| | +30° | — | 0.123 | 0.104 |
| | +40° | — | 0.091 | 0.089 |
| | +50° | — | 0.069 | 0.047 |

Figure 2:
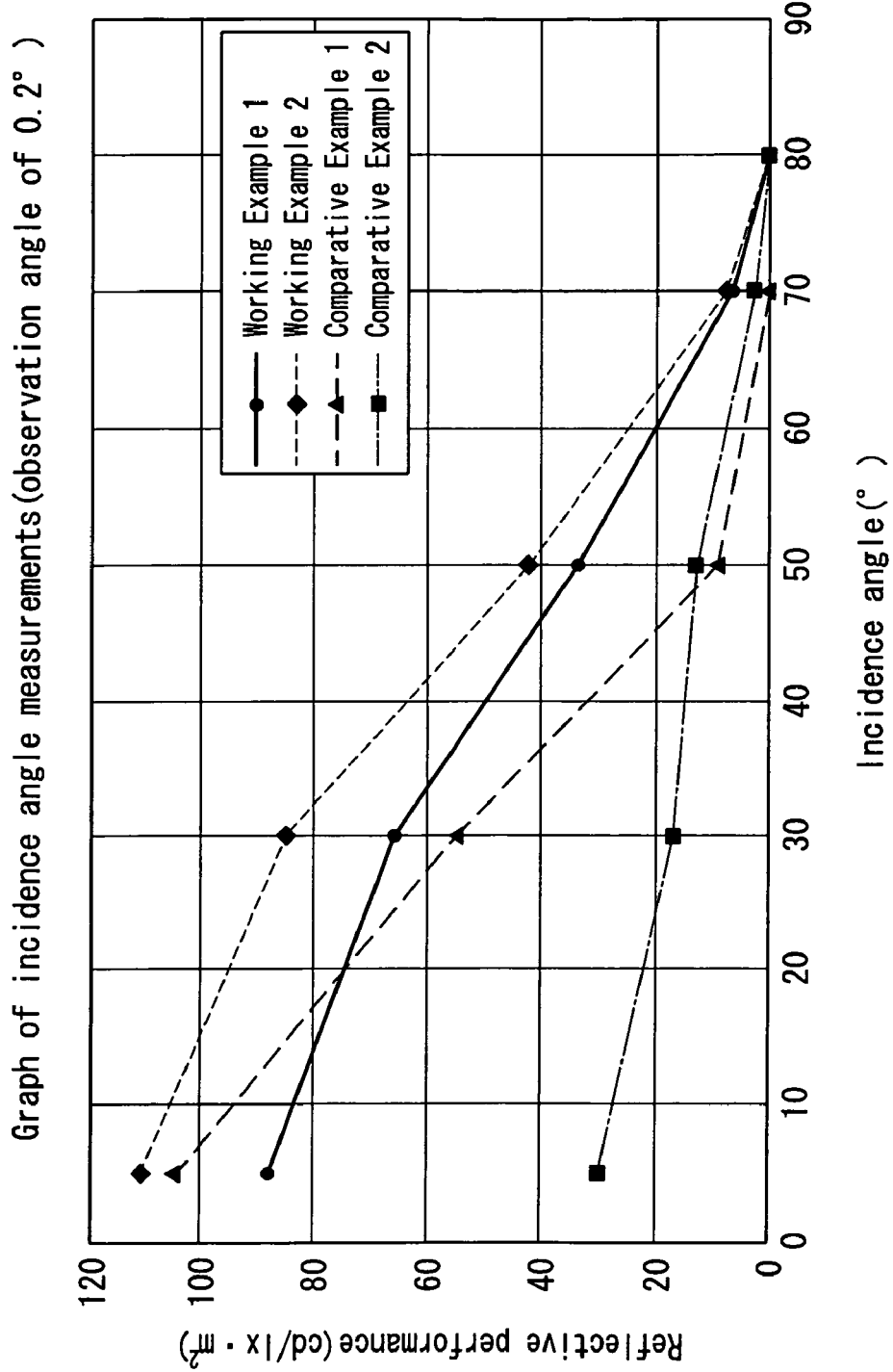
FIG. 2 is a graph of incidence angle and reflective performance measurements taken at an observation angle of 0.2° in Working Examples 1 and 2 and Comparative Examples 1 and 2.
Figure 3:
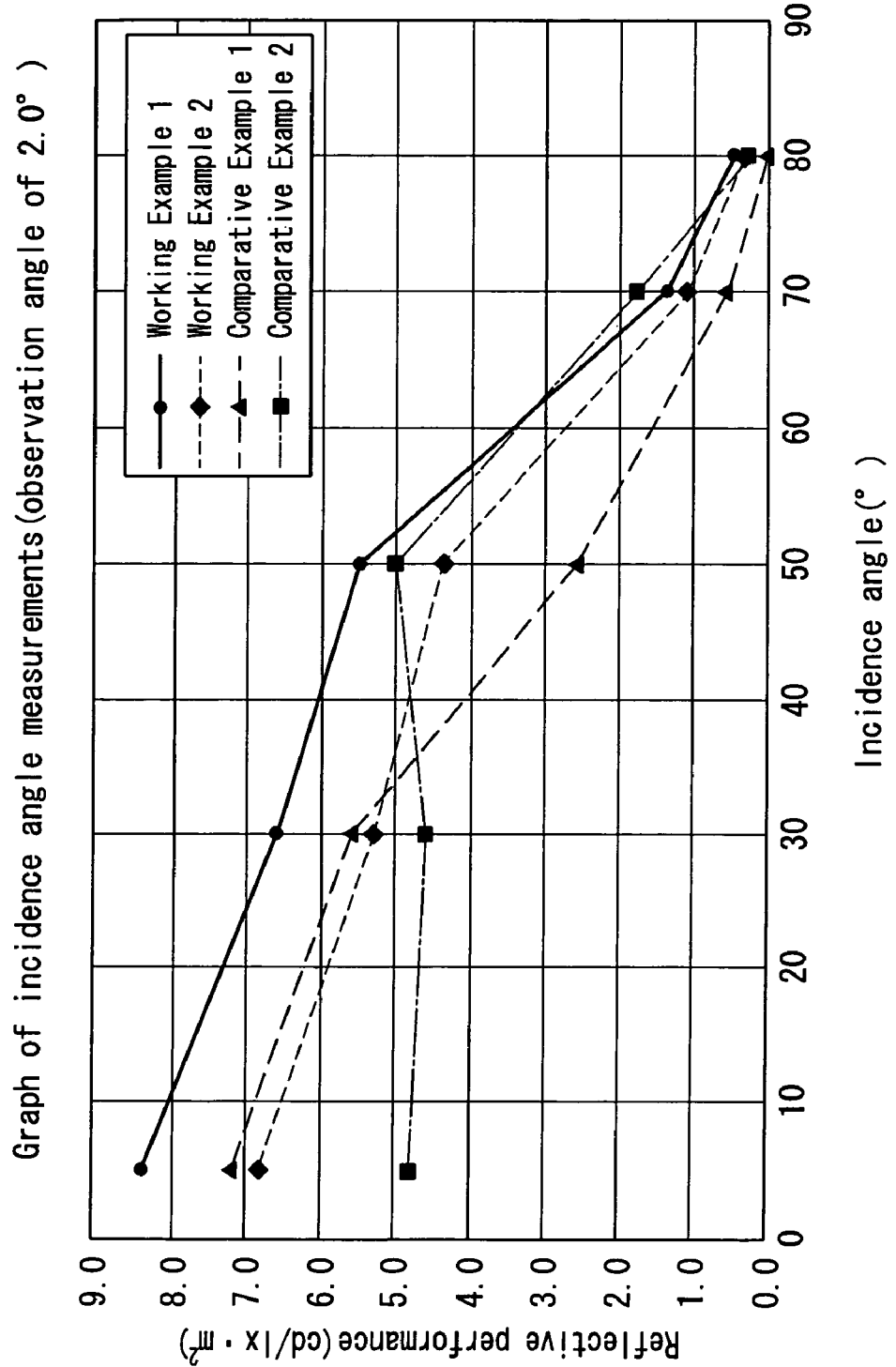
FIG. 3 is a graph of incidence angle and reflective performance measurements taken at an observation angle of 2.0° in Working Examples 1 and 2 and Comparative Examples 1 and 2.
Figure 4:
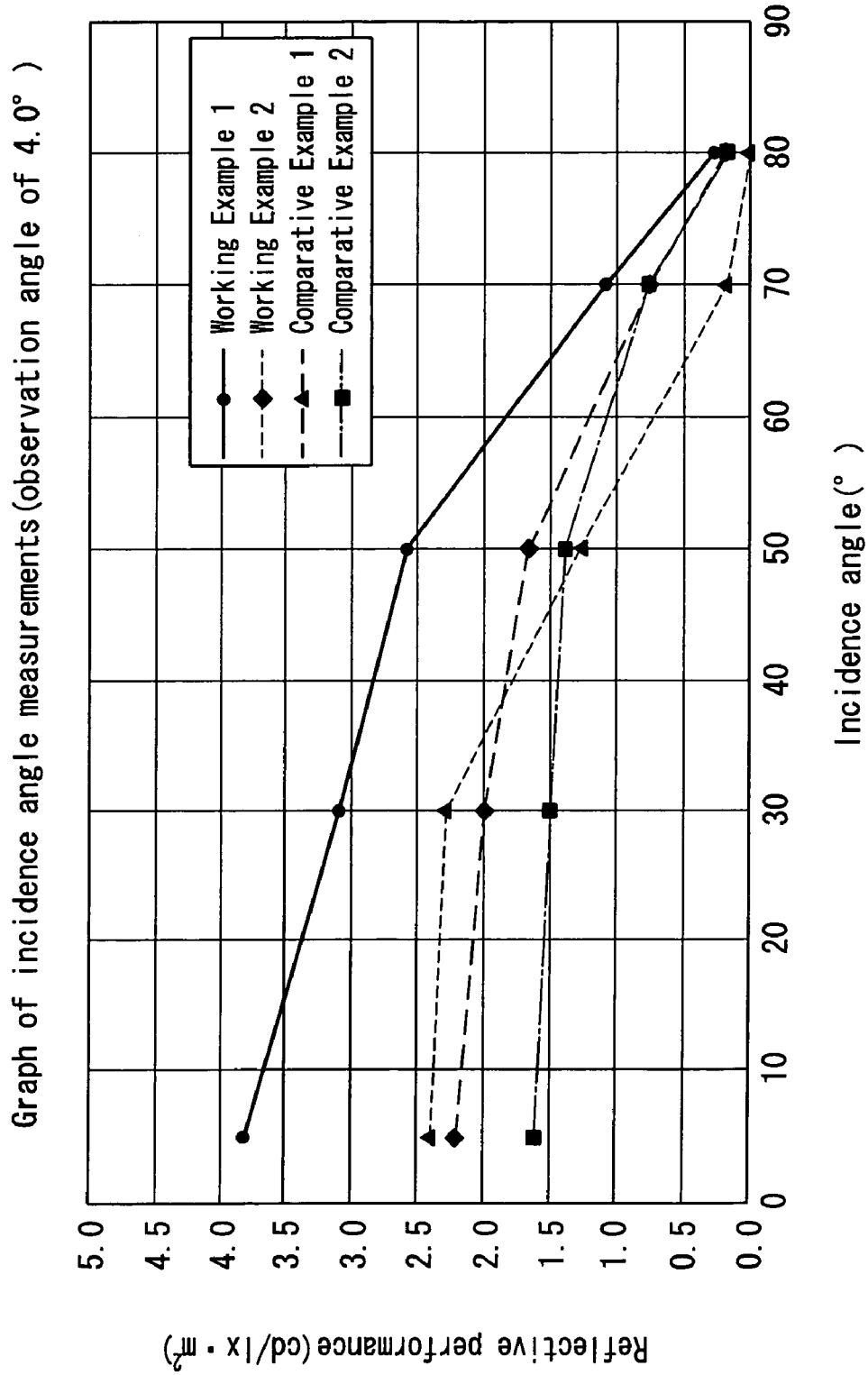
FIG. 4 is a graph of incidence angle and reflective performance measurements taken at an observation angle of 4.0° in Working Examples 1 and 2 and Comparative Examples 1 and 2.
Figure 9:
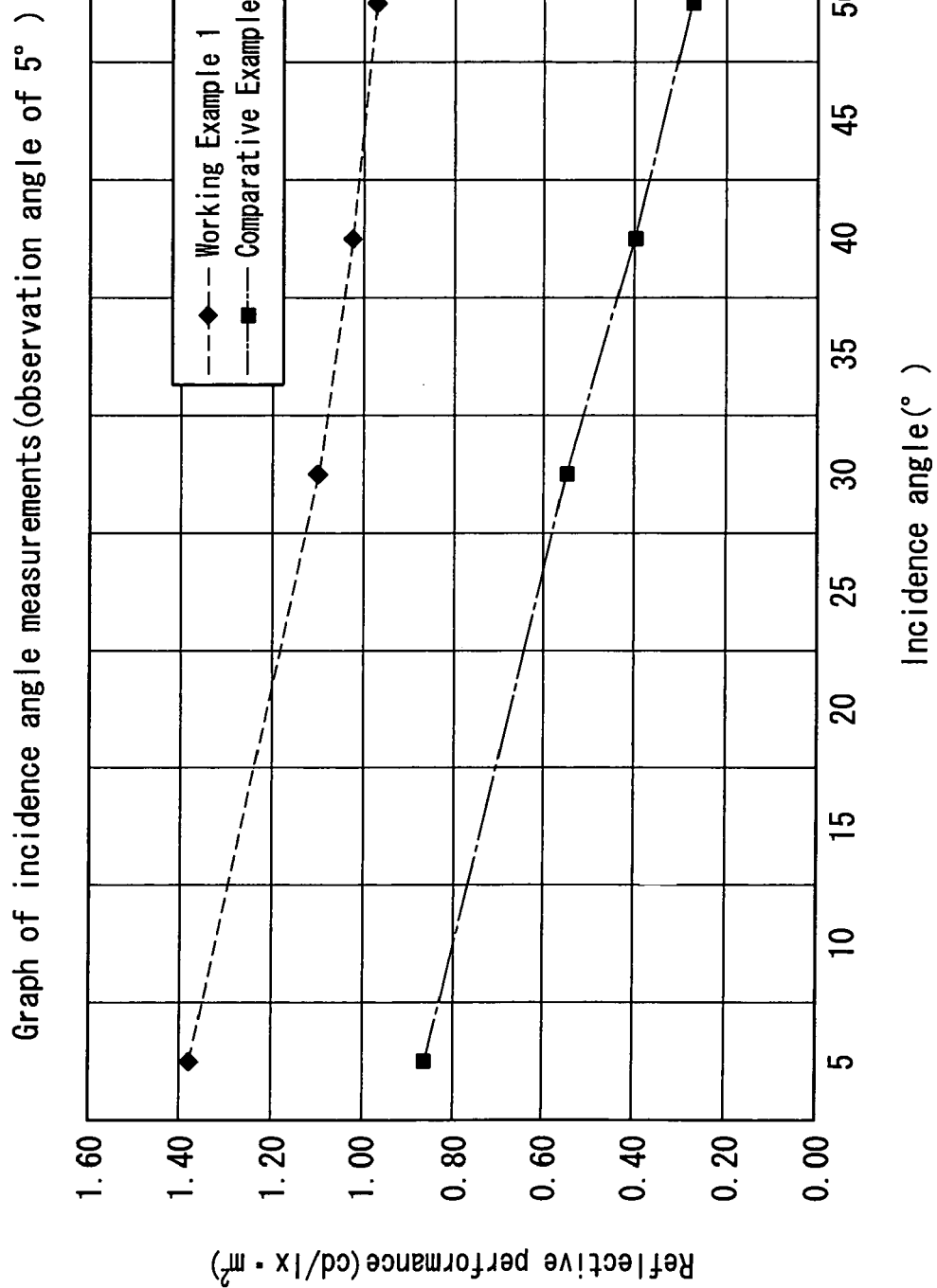
FIG. 9 is a graph of incidence angle and reflective performance measurements taken at an observation angle of 5° in Working Example 1 of the present invention and Comparative Example 3.
Figure 10:
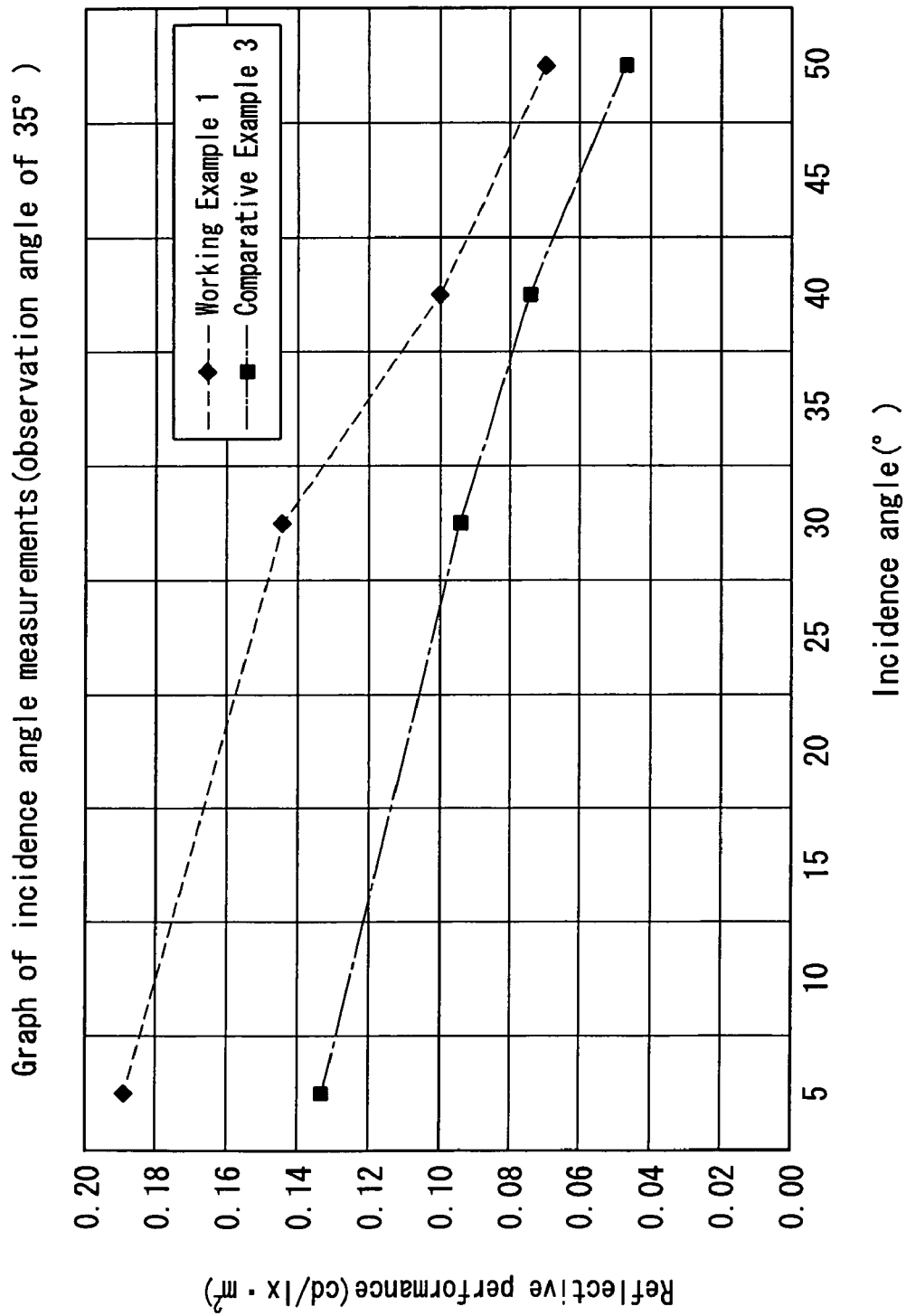
FIG. 10 is a graph of incidence angle and reflective performance measurements taken at an observation angle of 35° in Working Example 1 of the present invention and Comparative Example 3.
Figure 11:
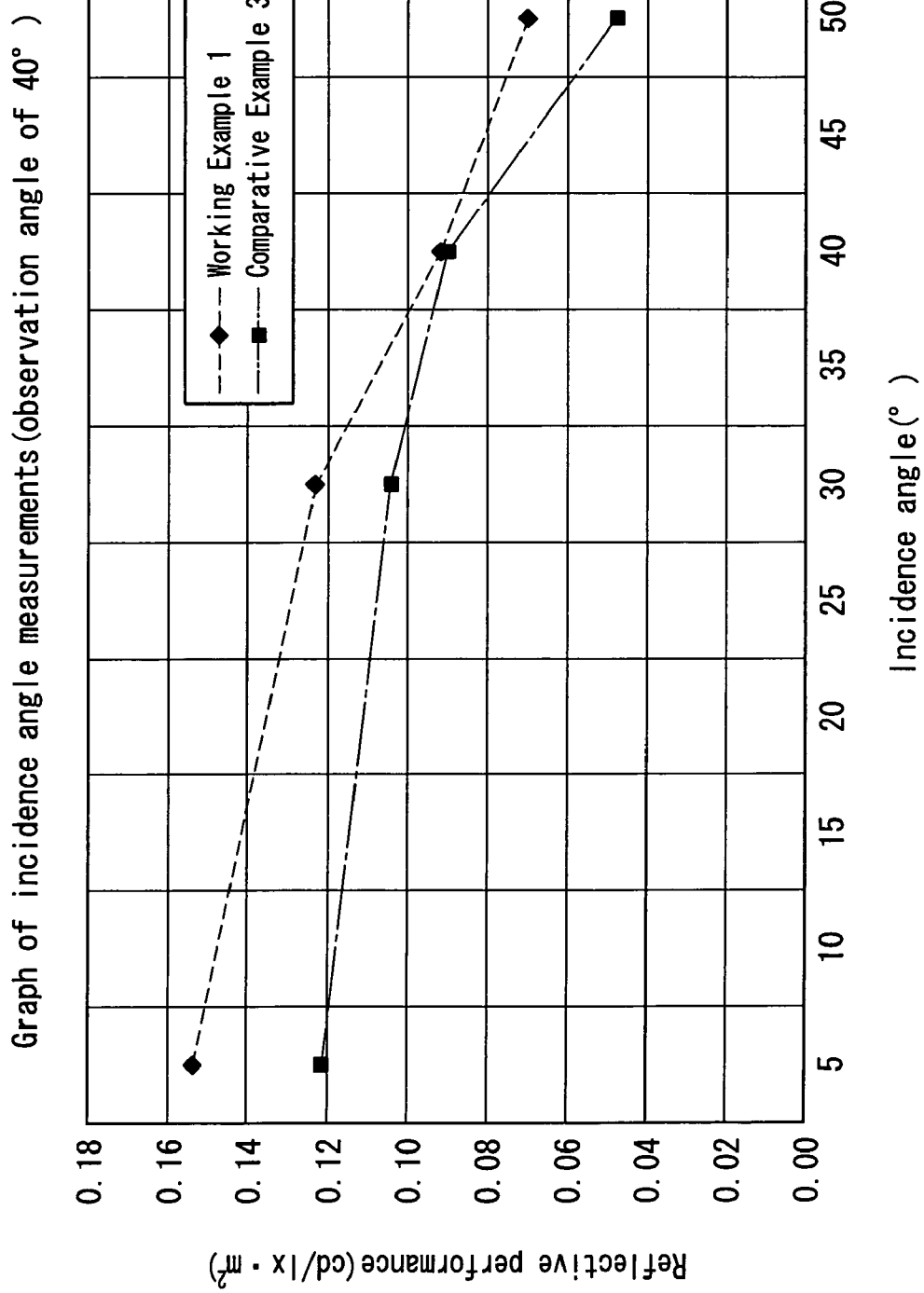
FIG. 11 is a graph of incidence angle and reflective performance measurements taken at an observation angle of 40° in Working Example 1 of the present invention and Comparative Example 3.

FIGS. 2 to 4 and 9 to 11 are graphs of the data contained in Tables 1 and 2. FIG. 2 is a graph of the results of measuring the incidence angle and reflective performance at an observation angle of 0.2°, FIG. 3 is a graph of the results of measuring the incidence angle and reflective performance at an observation angle of 2.0°, and FIG. 4 is a graph of the results of measuring the incidence angle and reflective performance at an observation angle of 4.0°. FIG. 9 is a graph of the results of measuring the incidence angle and reflective performance at an observation angle of 5°, FIG. 10 is a graph of the results of measuring the incidence angle and reflective performance at an observation angle of 35°, and FIG. 11 is a graph of the results of measuring the incidence angle and reflective performance at an observation angle of 40°.

It is clear from Table 1 and FIGS. 2 to 4 that with the retroreflective sheets of Working Examples 1 and 2 of the present invention, high retroreflection can be achieved even when the light is incident from a wide-angle location, and the observation angle can be increased. Also, these sheets provided the retroreflective performance needed to comply with world road signs standards for enclosed lens type retroreflective sheets. Specifically, a glass sphere group whose role is to maintain adequate retroreflective performance at an observation angle of 2° or less and at an incidence angle greater than 50°, and a glass sphere group whose role is to maintain retroreflective performance at an observation angle greater than the 2° set forth in the standards and at an incidence angle greater than 50°, both are contained in the same focusing layer, thereby dividing the glass spheres into two groups each having its own role, so wide-angle retroreflective performance can be maintained even at an incidence angle that is larger than 50° and at a large observation angle of 4°, which is approximately twice that of conventional products.

Figure 5C:
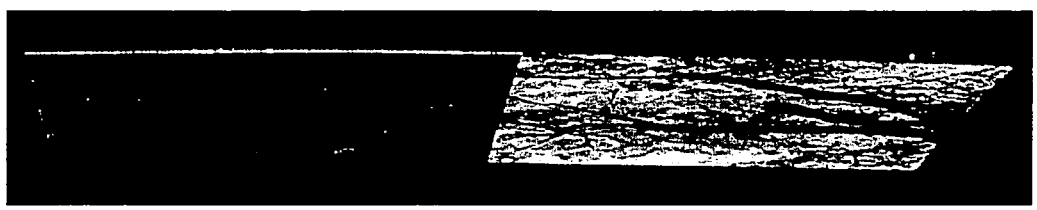
FIGS. 5A to 5C are examples of applying the retroreflective sheet of the present invention to print photographs, and illustrate the angle dependence of a conventional encapsulated high-intensity retroreflective sheet and Working Example 2 of the present invention.
Figure 5B:
Figure 5A:

FIG. 5 illustrates applications to print photographs by forming an image by sublimation dyeing in which a sublimable dye is made to penetrate into the image-forming resin layer and color. The "HI" in the upper photographs is a conventional encapsulated lens type high-intensity retroreflective sheet, while the "wide-angle reflection" in the lower photographs is the retroreflective sheet of Working Example 2 of the present invention. A is a photograph taken at a location with an observation angle of 2°, with the light incident on a panel at an angle of 5°, B is a photograph taken at a location with an observation angle of 2°, with the light incident on a panel at an angle of 50°, and C is a photograph taken at a location with an observation angle of 2°, with the light incident on a panel at an angle of 70°. It is clear from FIG. 5 that good retroreflection can be achieved with the products of the working examples of the present invention even when the light is incident from a wide-angle location, and the observation angle can be increased.

Figure 6A:
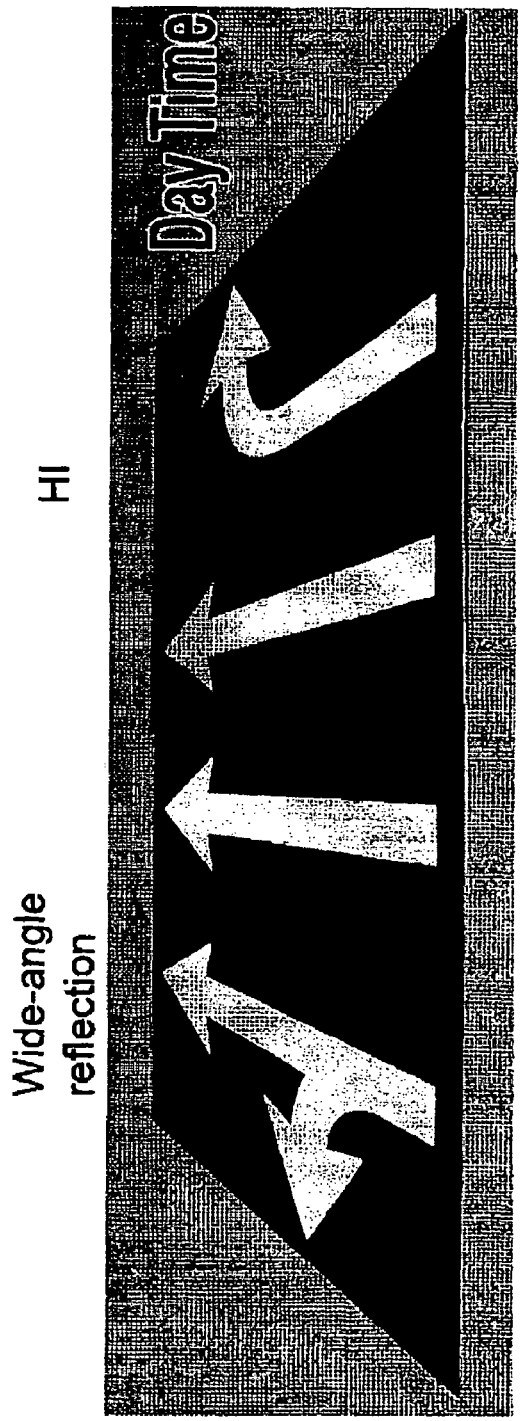
FIGS. 6A and 6B are photographs illustrating the angle dependence of a conventional encapsulated high-intensity retroreflective sheet (HI) and Working Example 1 of the present invention (wide-angle reflection), assuming that the retroreflective sheet of the present invention is used as a direction marking on a roadway.
Figure 6B:
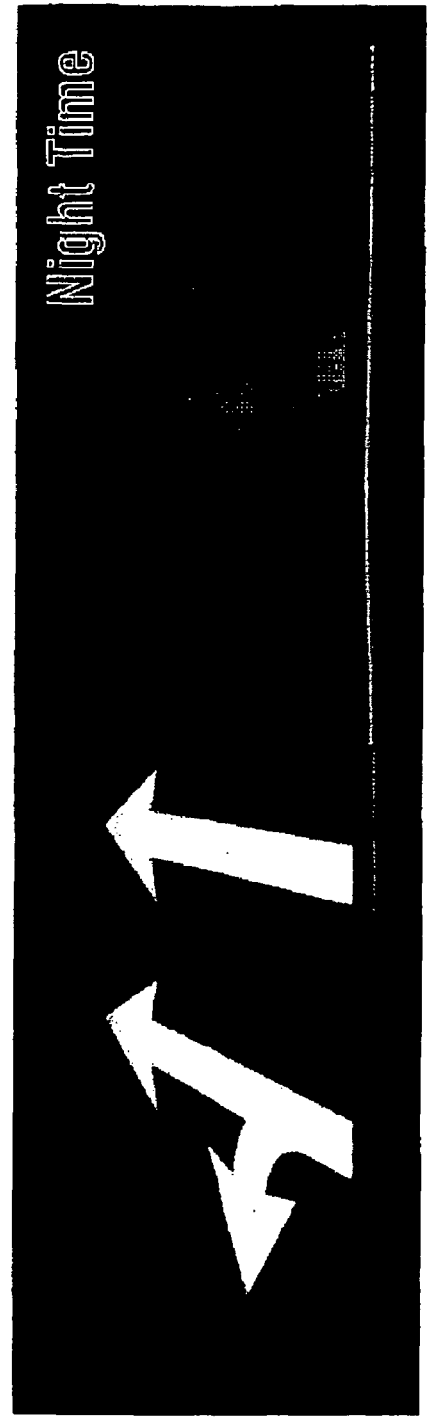

FIG. 6 illustrates a conventional encapsulated lens type high-intensity retroreflective sheet ("HI" in the right photographs) and the retroreflective sheet of Working Example 1 of the present invention ("wide-angle reflection" in the left photographs), with A being in the daytime and B at nighttime, assuming that the retroreflective sheet is used as a direction marking on a roadway. The nighttime photographs in B were taken from a location with an observation angle of 4°, with the light incident on the road markings at an angle of 70°. It is clear from FIG. 6 that the products of the working examples of the present invention (on the left side) are capable of good retroreflection even when the light is incident from a wide-angle location in the nighttime, and the observation angle can be increased.

Also, it is clear from Table 2 and FIGS. 9 to 11 that the retroreflective sheet of Working Example 1 of the present invention exhibits superior reflective performance at a larger observation angle (5°, 35°, and 40°) and a larger incidence angle (5°, 30°, 40°, and 50°) than the commercially available encapsulated retroreflective sheet having wide observation angle characteristics. Specifically, when used in an external distant illumination system, the retroreflective sheet of the present invention exhibits far better reflective performance than a commercially available encapsulated retroreflective sheet having wide observation angle characteristics.

Table 3 shows the reflective performance of the retroreflective sheet of Working Example 3 of the present invention.

TABLE 3

| Observation angle | Incidence angle | Yellow | Red | Orange | Green | Blue |
|---|---|---|---|---|---|---|
| 0.2° | +5° | 62 | 24 | 46 | 26 | 8.8 |
| | +30° | 46 | 16 | 34 | 18 | 5.9 |
| | +40° | 35 | 11 | 27 | 13 | 4.3 |
| | +50° | 24 | 8.6 | 18 | 9.7 | 3.6 |
| | +70° | 5.0 | 1.8 | 3.7 | 2.1 | 0.8 |
| | +80° | 0.6 | 0.3 | 0.5 | 0.2 | 0.1 |
| 2.0° | +5° | 5.9 | 2.4 | 4.3 | 2.6 | 0.9 |
| | +30° | 4.8 | 1.8 | 3.6 | 2.0 | 0.7 |
| | +40° | — | — | — | — | — |
| | +50° | 3.7 | 1.5 | 2.6 | 1.6 | 0.6 |
| | +70° | 1.0 | 0.4 | 0.8 | 0.5 | 0.1 |
| | +80° | 0.4 | 0.1 | 0.3 | 0.2 | 0.05 |
| 4.0° | +5° | 2.8 | 1.1 | 1.9 | 1.3 | 0.5 |
| | +30° | 2.1 | 0.8 | 1.6 | 0.9 | 0.3 |
| | +50° | 1.9 | 0.7 | 1.5 | 0.8 | 0.3 |
| | +70° | 0.8 | 0.3 | 0.6 | 0.3 | 0.1 |
| | +80° | 0.2 | 0.1 | 0.2 | 0.1 | 0.03 |

It is clear from Table 3 that the reflective performance of the retroreflective sheet of Working Example 3 of the present invention surpasses the base values set forth for each color, confirming that the retroreflective sheet of the present invention exhibits superior reflective performance even in color.

INDUSTRIAL APPLICABILITY

The retroreflective sheet of the present invention is useful in many different applications, examples of which include traffic signs, guide signs, warning signs, restriction signs, vehicle license plates, advertising signs, and print photographs. It also can be utilized in external distant illumination systems.

The invention claimed is:

1. An enclosed lens type retroreflective sheet comprising a surface layer including at least one layer, a focusing layer containing glass spheres, and a metal reflective layer on the back side of the focusing layer,
   wherein the glass spheres are disposed at random locations in the thickness direction of the focusing layer,
   the glass spheres include a first glass sphere group that provides reflective performance at a small observation angle of 2° or less and up to a large incidence angle of from 5° to less than 90° and a second glass sphere group that provides reflective performance at an observation angle greater than 2° and up to a large incidence angle of from 5° to less than 90° in the same focusing layer,
   the focusing layer for the second glass sphere group is thinner at the glass spheres than a focus formation position for the glass spheres,
   the surface layer is present at positions over the first and second glass sphere groups, and
   the metal reflective layer is formed on the back side of the focusing layer to follow the shape of the glass spheres.

2. The retroreflective sheet according to claim 1, wherein the first glass sphere group comprises spheres in contact with the surface layer, and the second glass sphere group comprises spheres located away from the surface layer.

3. The retroreflective sheet according to claim 2, wherein the focusing layer formed in the form of concentric circles on the glass sphere surfaces of the glass spheres in contact with the surface layer has a thickness at which the maximum reflective performance is exhibited at an observation angle of 0.2° and an incidence angle of 5°, the thickness of the focusing layer of the glass spheres located away from the surface layer is less than the thickness of the focusing layer of the glass spheres in contact with the surface layer, and the glass spheres located away from the surface layer exhibit retroreflective performance at a relatively larger observation angle than the glass spheres in contact with the surface layer.

4. The retroreflective sheet according to claim 2, wherein the proportion of glass spheres in contact with the surface layer is from 50 to 90 weight percent of the total glass spheres.

5. The retroreflective sheet according to claim 1, wherein the metal reflective layer of the first glass sphere group is formed at the focus formation position of the glass spheres.

6. The retroreflective sheet according to claim 1, wherein the refractive index of the glass spheres is within a range of at least 2.10 and no more than 2.40.

7. The retroreflective sheet according to claim 1, wherein the glass spheres have a median diameter within a range of at least 35 μm and no more than 75 μm, and at least 80% of the glass spheres have a median diameter within a range of ±10 μm.

8. The retroreflective sheet according to claim 1, wherein the main component of the resin that makes up the focusing layer is a polyvinyl acetal resin.

9. The retroreflective sheet according to claim 8, wherein the polyvinyl acetal resin is a polyvinyl butyral resin with a degree of polymerization of 500 to 1500.

10. The retroreflective sheet according to claim 9, wherein the polyvinyl alcohol units of the polyvinyl butyral resin account for at least 17 wt % and no more than 23 wt %.

11. The retroreflective sheet according to claim 9, wherein the glass transition point (Tg) of the polyvinyl butyral resin is at least 60° C. and no higher than 80° C.

12. The retroreflective sheet according to claim 9, wherein the hydroxyl groups in the polyvinyl alcohol units of the polyvinyl butyral resin have been crosslinked with an amino resin, and the focusing layer is one that does not dissolve when immersed for 1 minute in toluene, for 1 minute in xylene, or for 10 minutes in methanol.

13. The retroreflective sheet according to claim 1, wherein the mixing proportions of the glass spheres and the resin weight of the focusing layer are such that the glass spheres account for 1.5 to 3.7 weight parts per weight part of resin.

14. The retroreflective sheet according to claim 1, wherein the focusing layer contains a non-silicon-based anti-foaming agent in an amount of 0.01 to 3.0% of the resin weight of the focusing layer.

15. The retroreflective sheet according to claim 14, wherein the non-silicon-based anti-foaming agent is an alkyl vinyl ether copolymer.

16. The retroreflective sheet according to claim 1, wherein the surface layer includes at least one coating layer, or at least one coating layer formed over a resin sheet, and the coating layer is a composition obtained by blending at least one resin component selected from among fluoro-olefin copolymers containing a reactive functional group, polyester resins, alkyd resins, polyurethane resins, vinyl resins, and acrylic polymers containing a reactive functional group, and at least one curing agent selected from among amino resins, epoxy resins, polyisocyanates, and block polyisocyanates, and/or curing catalyst.

17. The retroreflective sheet according to claim 16, wherein the resin component of the coating layer is a fluoro-olefin copolymer containing a reactive functional group.

18. The retroreflective sheet according to claim 1, wherein the surface layer includes at least one coating layer, or at least one coating layer formed over a resin sheet, and the outermost layer of the coating layer is a fluoro-olefin copolymer composition.

19. An external illumination system, comprising a sign having a sign face including an enclosed lens type retroreflective sheet comprising a surface layer including at least one layer, a focusing layer containing glass spheres, and a metal reflective layer on the back side of the focusing layer, wherein the glass spheres are disposed at random locations in the thickness direction of the focusing layer, the glass spheres include a first glass sphere group that provides reflective performance at a small observation angle of 2° or less and up to a large incidence angle of from 5° to less than 90° and a second glass sphere group that provides reflective performance at an observation angle greater than 2° and up to a large incidence angle of from 5° to less than 90° in the same focusing layer, the focusing layer for the second glass sphere group is made thinner at the glass spheres than a focus formation position for the glass spheres, the surface layer is present at positions over the first and second glass sphere groups, and the metal reflective layer is formed on the back side of the focusing layer to follow the shape of the glass spheres, and an external illumination source, wherein the external illumination source is disposed at a fixed distance from the sign and the distance from the illumination source to the sign face is within a range of at least 1 m and no more than 100 m.

20. The external illumination system according to claim 19, wherein the illumination source emits light that is incident on the sign face at an incidence angle of at least 0° and no more than 50° to the sign face, and the sign face exhibits reflective performance of at least 0.07 at an observation angle of 35° when reference light A whose color temperature is 2856K is incident thereon at an incidence angle of 35°, where "incidence angle" refers to the angle formed by the irradiation axis of projected light and the face center normal line of the retroreflective sheet, "observation angle" refers to the angle formed by the irradiation axis of projected light and the observation axis, and "reflective performance" refers to a coefficient calculated from the following equation:

$$\text{retroreflective coefficient } R' = I/ES \cdot A$$

$R'$: retroreflective coefficient

ES: illuminance (1×) on a plane perpendicular to the incident light when light is incident at a center position of a test piece A: test piece surface area (m$^2$)

I: calculated from the following equation at the luminosity (Cd) toward the observation axis produced by a test piece $$I = Er \cdot d^2$$

where Er is the illuminance (1×) on a light receptor, and d is the distance (m) between the test piece surface center and the light receptor.

21. The external illumination system according to claim 19, wherein, when reference light A whose color temperature is 2856K irradiates the sign face from the outside, the reflective performance at an observation angle of 5° and an incidence angle of 50° is at least 0.5, and the reflective performance at an observation angle of 40° and an incidence angle of 50° is at least 0.055.

* * * * *